United States Patent
Sato

(10) Patent No.: US 7,569,115 B2
(45) Date of Patent: *Aug. 4, 2009

(54) ASSEMBLAGES OF MAGNETIC ALLOY NANOPARTICLES

(75) Inventor: Kimitaka Sato, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 516 days.

This patent is subject to a terminal disclaimer.

(21) Appl. No.: 10/566,169

(22) PCT Filed: Jul. 30, 2004

(86) PCT No.: PCT/JP2004/011320

§ 371 (c)(1),
(2), (4) Date: Jan. 27, 2006

(87) PCT Pub. No.: WO2005/009653

PCT Pub. Date: Feb. 3, 2005

(65) Prior Publication Data

US 2007/0125453 A1 Jun. 7, 2007

(30) Foreign Application Priority Data

Jul. 30, 2003 (JP) ............................... 2003-282657

(51) Int. Cl.
*H01F 1/06* (2006.01)
(52) U.S. Cl. ...................... 148/306; 148/311; 148/315; 75/255
(58) Field of Classification Search ....................... None
See application file for complete search history.

(56) References Cited

U.S. PATENT DOCUMENTS

| 6,262,129 | B1 * | 7/2001 | Murray et al. ................. 516/33 |
| 6,666,930 | B2 * | 12/2003 | Aoyama et al. ............. 148/306 |
| 6,777,078 | B2 * | 8/2004 | Maeda et al. ............. 428/836.1 |
| 6,875,253 | B2 * | 4/2005 | Daimon et al. ................. 75/255 |
| 7,390,576 | B2 * | 6/2008 | Sato ........................... 428/546 |
| 2002/0117235 | A1 * | 8/2002 | Kanekiyo et al. ............ 148/101 |
| 2004/0074336 | A1 * | 4/2004 | Daimon et al. ................. 75/365 |
| 2005/0051241 | A1 * | 3/2005 | Tohji ......................... 148/306 |
| 2006/0032330 | A1 * | 2/2006 | Sato ........................... 75/371 |

FOREIGN PATENT DOCUMENTS

| JP | 3258295 | 12/2001 |
| WO | WO 02/062509 | 8/2002 |

OTHER PUBLICATIONS

S. Sun et al., "Monodisperse FePt Nanoparticles and Ferromagnetic FePt Nanocrystal Superlattices", Science, vol. 287, Mar. 17, 2000, pp. 1989-1992.
B. Jeyadevan et al., "Direct Synthesis of fct-FePt Nanoparticles by Chemical Route", Jpn. J. Appl. Phys., vol. 42, Part 2, No. 4A, Apr. 1, 2003, pp. L350-L352.

* cited by examiner

*Primary Examiner*—John P. Sheehan
(74) *Attorney, Agent, or Firm*—Clark & Brody

(57) ABSTRACT

Assemblages of particles of a magnetic alloy that are suited to magnetic recording are represented by the formula $[T_xM_{1-x}]$ containing T and M in a composition ratio where X in the formula is in the range from 0.3 or greater to 0.7 or less, where T is one or two members of the group consisting of Fe and Co and M is one or two members of the group consisting of Pt and Pd, and metallic elements other than T and M that constitute no more than 30 at. % (including 0 at. %) of (T+M) as a percentage of atoms, and the remainder consists of impurities that are unavoidable from a production standpoint, wherein: the face-centered tetragonal fraction is 10-100%, the average grain size as measured by TEM observation ($D_{TEM}$) is in the range from 5-30 nm, the x-ray crystal grain size derived by x-ray diffraction ($D_X$) is no less than 4 nm, the particles of are dispersed from each other at a distance, and the dispersion on the composition of the individual particles is kept within a stipulated range.

8 Claims, 8 Drawing Sheets

ASSEMBLAGES OF MAGNETIC ALLOY NANOPARTICLES

TECHNICAL FIELD

This invention relates to assemblages of magnetic alloy particles particularly suited to magnetic recording.

BACKGROUND ART

In order to increase the magnetic density of high-density magnetic recording medium, it is necessary to reduce the size of the basic unit for recording, but media that utilize conventional sputtered thin films are nearing the upper limits for increasing the recording density due to problems such as thermal decay and increasingly fine crystalline particle sizes and greater dispersion therein. Thus, as candidates for high-density magnetic recording medium, considerable attention has recently been focused on FePt-based magnetic metal nanoparticles that do not have problems with thermal decay and have high anisotropy and exhibit a large coercivity.

Regarding these magnetic metal nanoparticles, Patent Document 1 and Non-Patent Document 1 recite methods of preparing monodispersed FePt metal nanoparticles by performing simultaneous thermal decomposition of iron pentacarbonyl and reduction of platinum(II) acetylacetonate by polyol.

The crystal structure of FePt particles obtained by these methods is a chemically disordered face-centered cubic (fcc) structure, so nano-order particles exhibit superparamagnetism at room temperature. Accordingly, in order for them to be used as ferromagnetic particles, these disordered phases must be subjected to annealing to achieve a crystal structure transition to the chemically ordered $L_{10}$ phase (face-centered tetragonal (fct) structure).

This annealing requires treatment at a temperature above the phase transition temperature $(T_t)$ from the disordered phase to the ordered phase, and is typically performed at a high temperature above 500° C. In this case, if heat causes coalescence among the particles and an increase in particle size so that the breadth of distribution in the grain size distribution is enlarged, the particles are no longer suitable for use in high-density magnetic recording medium, because of the coexistence of single-domain and multidomain structures. Accordingly, in order to obtain FePt nanoparticles that exhibit ferromagnetism while maintaining the as-prepared grain size of the particles, coating the particles with a protective coating that prevents the coalescence of particles or reducing the $T_t$ by some method so that the annealing can be performed at a lower annealing temperature have been found to be effective.

Non-Patent Document 2 recites a method whereby tetraethylene glycol (TEG) is used as the polyol at the time of preparation of FePt nanoparticles by the polyol method, so when platinum and iron acetylacetonate are reduced at 300° C., FePt nanoparticles with the fct structure are obtained as produced.

Patent Document 1: Japanese Patent No. 3258295 (JP2000-54012A)

Non-Patent Document 1: Science, Vol. 287, 17 Mar. 2000, pp. 1989-1992

Non-Patent Document 2: *Japanese Journal of Applied Physics*, Vol. 42, No. 4A, 1 Apr. 2003, pp. L350-352

Problems to be Overcome by the Invention

The FePt nanoparticles obtained by the aforesaid method of Patent Document 1 and Non-Patent Document 1 (hereinafter, the method recited in these documents may be referred to as the "IBM method") have a face-centered cubic (fcc) structure that has no magnetism immediately after the reaction, so they cannot be utilized as magnetic particles as is for magnetic recording medium applications. Thus, it is necessary to subject them to annealing at above the fct phase transition temperature $(T_1)$ to achieve a transition to the face-centered tetragonal (fct) structure that exhibits ferromagnetism. At this time, the phase transition temperature for FePt particles obtained by the IBM method is roughly 450° C., so annealing at a temperature above 450° C. is required to cause the transition to the fct structure.

However, if assemblages of these FePt particles (as a powder) are heated as is to a temperature above 450° C., the metal particles will coalesce and result in an increased particle size, so even if the fct structure is obtained, they will not be in a nanoparticle form suited to high-density recording medium applications, and also the coalescence of particles will not typically progress uniformly, thus giving rise to a grain size distribution and an accompanying large distribution in magnetic characteristics, which are practical problems.

In order to prevent the coalescence of particles and increased particle size due to heat, it is necessary to perform this annealing in a state in which the individual particles are positioned so as to have stipulated distances between them, e.g., in a state in which the individual particles are fixed at stipulated positions upon a substrate, or in a state in which there is some sort of barrier that prevents the individual particles from being sintered together. In order to achieve this type of annealing, fine-scale techniques for achieving the regular ordering of particles are required.

In addition, with this IBM method, even in the case of preparing FePt particles having Fe=50 at. % and Pt=50 at. %, for example, the Fe raw material must be charged in a molar amount twice as large, so control of the particle composition is difficult. What should be done to eliminate dispersion in composition among particles is also unknown.

In a FePt alloy, the chemically ordered fct structure of the ferromagnetic phase is limited to the case in which the Pt content is in the range of 35-55 at. %. Accordingly, even if the Pt content is in this range in the average composition of an assemblage of particles, when looking at individual particles, if particles of a composition outside this range are present, then even if those particles are annealed as described previously, they will not have an ordered fct structure. In addition, even if the Pt content of each particle is assumed to be in the range 35-55 at. %, if the composition varies among particles, their magnetic characteristics will also vary, so they will not be suitable for magnetic recording medium.

Furthermore, with the IBM method, even if annealing of particles having the fcc structure is accomplished in the state of being fixed upon a substrate without sintering occurring, it is extremely difficult to orient the easy-magnetization axis of the fct-structure particles thus obtained in a single direction. The reason why is because the individual particles that undergo phase transition to the fct structure upon a substrate are fixed to the substrate and are thus unlikely to move if one attempts to orient their magnetic fields, and also, the temperature at which the fct structure is assumed is higher than the Curie temperature of the FePt particles, so even if annealing is performed in a magnetic field, the easy-magnetization axes cannot be brought into a single direction.

After all, a magnetic substance exhibits the greatest coercivity in the direction of its easy-magnetization axis. When magnetic nanoparticles are disposed upon a substrate, if the easy-magnetization axes are oriented in a single direction, the greatest potential of the magnetic nanoparticles can be achieved and the coercivity of the medium upon which they are disposed can be maximized. Conversely, when the easy-magnetization axes are oriented randomly, the coercivity of that medium is minimized. When looking at a medium with such a random orientation from a certain direction, even if there may be a particle with its easy-magnetization axis pointing in that direction, there will also be a particle with its not easy-magnetization axis pointing in the direction of the minimum coercivity, so the coercivity distribution (SFD value) can be said to be in the most deleterious state. It is well known that decreased coercivity and a deleterious SFD value are disadvantageous to high-density magnetic recording (see Kiroku•Memori Zairyō Handobukku [Recording/Memory Materials Handbook] Tetsuya Ōsaka, Yōtarō Yamazaki, Hiroshi Ishihara, eds., for example). Accordingly, the technique itself of performing annealing after disposing particles with the fcc structure upon a substrate can be said to be incompatible with high-density magnetic recording medium applications. This is the reason why the development of assemblages of independent FePt particles that have the fct structure while also having the freedom of being able to be oriented in a magnetic field is necessary for the development of high-density magnetic recording medium.

Non-Patent Document 2 shows that it is possible to obtain FePt nanoparticles that have the fct structure as prepared. However, powders of FePt nanoparticles obtained by the method recited in this document, even those obtained by the method of preparation using TEG at 300° C., have room-temperature coercivity (Hc) of only 370 Oersted (Oe). In comparison to that prepared at 260° C. using the same tetraethylene glycol (TEG), this FePt nanoparticle powder was confirmed to have the fct structure, but even then its room-temperature coercivity (Hc) is roughly 370 Oe and there is difficulty in its application to actual magnetic recording.

In addition, Non-Patent Document 2 states that FePt nanoparticles having the fct structure as-prepared were obtained, but the individual particles do not necessarily have a uniform composition. In fact, according to Non-Patent Document 2, the metal salts serving as the raw materials for the particles are dissolved in a polyol which serves as both the solvent and reducing agent, the solution is heated up to a stipulated temperature at a constant rate and then held at a stipulated temperature after heating, thereby precipitating the FePt particles. With this method, the crystal nuclei are assumed to be generated continuously over time, so depending on the times when the individual crystals are formed, the ion composition ratio of the metal ions within the reaction solution will be different, and thus it is unavoidable that dispersion will occur in the diameters of the individual particles thus formed and in the sizes of the crystals within the particles, and as a result, it is inevitable that the compositions of the individual particles will differ from each other. Accordingly, even if they may have the fct structure, the individual particles may have a Pt content somewhat greater or less than the alloy composition (average composition) of the entire powder (a distribution appears in the composition of the individual particles and that distribution becomes broad), so some particles may be magnetic and some may not, and even if they are magnetic, their magnetism may be strong or weak.

In the case of magnetic recording, if particles that are not magnetic are mixed in, important data may not be recorded. In addition, ordinary write heads used in magnetic recording are adjusted so as to be able to write to magnetic material having certain magnetic characteristics, so if the magnetism is too strong or weak, phenomena in which information is not recorded well may occur.

Accordingly, an object of the present invention is to solve the aforementioned problems and, in particular, to make further improvements to the method of producing FePt nanoparticles disclosed in Non-Patent Document 2, so as to obtain magnetic material consisting of fct-structure FePt-based nanoparticles with a narrow distribution in composition that are suitable as actual magnetic recording materials.

DISCLOSURE OF THE INVENTION

The present inventor succeeded in obtaining assemblages of nanoparticles having an fct structure that have a narrow distribution in composition and good crystallinity, and that are able to flow while dispersed and maintaining a stipulated inter-particular distance between the particles. Specifically, the present invention comprises assemblages of particles of a magnetic alloy represented by the formula $[T_XM_{1-X}]$ containing T and M in a composition ratio where X in the formula is in the range from 0.3 or greater to 0.7 or less, where T is one or two members of the group consisting of Fe and Co and M is one or two members of the group consisting of Pt and Pd, and metallic elements other than T and M that constitute no more than 30 at. % (including 0 at. %) of (T+M) as a percentage of atoms, and the remainder consists of impurities that are unavoidable from a production standpoint, wherein:

said assemblages of magnetic alloy particles are such that:

A. the face-centered tetragonal fraction is 10-100%,

B. the average grain size as measured by TEM observation ($D_{TEM}$) is in the range from 5-30 nm, C. the x-ray crystal grain size derived by x-ray diffraction ($D_X$) is no less than 4 nm, D. the particles of the size $D_{TEM}$ above are dispersed from each other at a distance, and E. 95 or more out of 100 particles satisfy the conditions of Equation (1) below, and Equation (2) is also satisfied.

$$0.90X_{av} \leq X_1, X_2, \ldots X_{100} \leq 1.10X_{av} \qquad (1)$$

$$\text{standard deviation } \sigma \text{ of } X_1, X_2, \ldots X_{100} \leq 20\% \qquad (2)$$

Here, $X_{av}$ represents the value of X in the composition formula $[T_XM_{1-X}]$ as actually measured in the assemblage of particles (the value of X in the average composition of the particle assemblage), and $X_1, X_2, \ldots X_{100}$ represent the values of X in the composition formula measured in individual particles in TEM-EDX measurement of the assemblages, for each of 100 particles $X_n$ selected arbitrarily when 1000 particles are in the field of view of measurement.

Each of the individual particles of the magnetic alloy according to the present invention preferably has fluidity in the state of being dispersed at a distance of at least 1 nm from each other. It is particularly preferable that the surface of each particle be coated with a surfactant. The assemblages of magnetic alloy particles according to the present invention exhibit an x-ray crystal grain size ($D_X$) of 6 nm or greater and a coercivity (Hc) of 1000 Oe or greater.

The metallic elements other than T and M may be the N components derived from nucleating agents used in the process of producing the alloy according to the present invention, where the N components may be at least one element selected from the group consisting of Au, Ru, Rh, O and Ir, or may be the Z components that function to reduce the fct crystal structure transition temperature ($T_t$), where the Z components are at least one element selected from the group consisting of Ag, Cu, Sb, Bi and Pb.

PREFERRED EMBODIMENTS OF THE INVENTION

Figure 1:
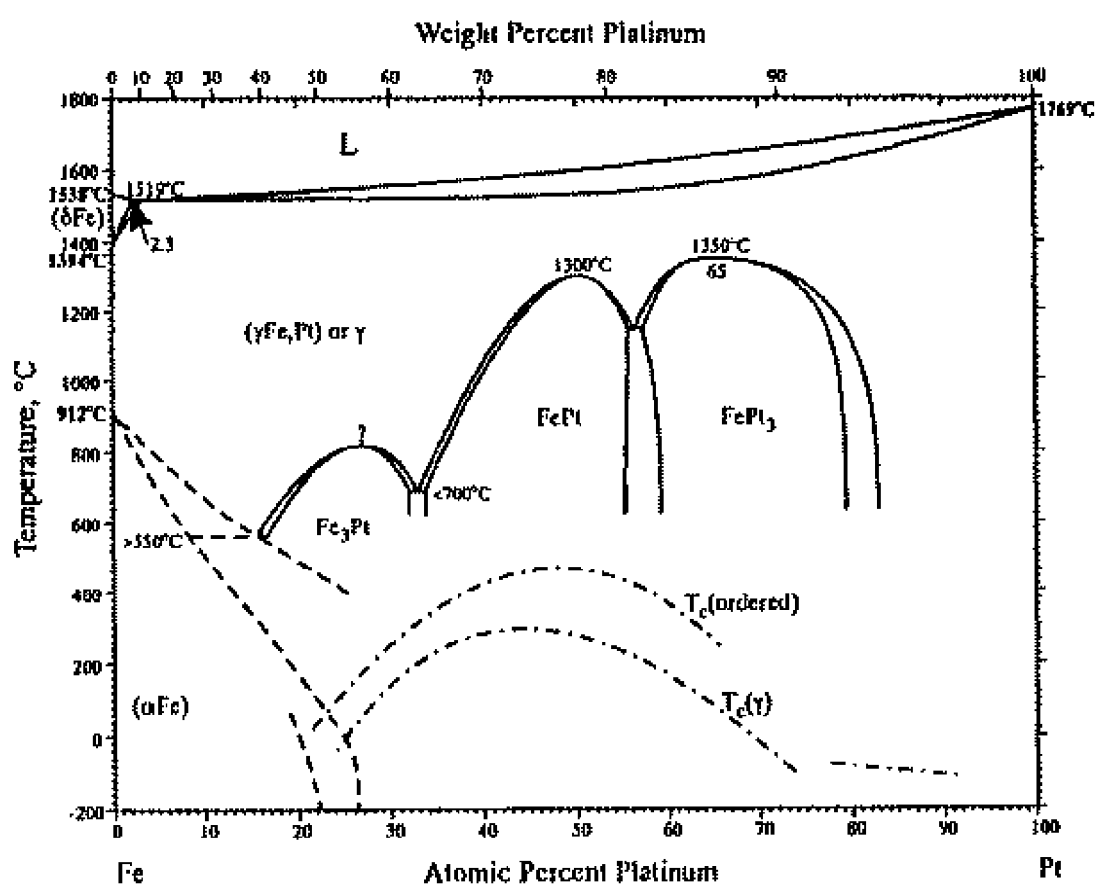
FIG. 1 is a Fe—Pt binary equilibrium state diagram.

Here follows a detailed description of the preferred embodiments of the present invention made for each of the features specified in the present invention.

Constituent Composition of the Magnetic Alloy

The assemblage of magnetic alloy particles (also called a magnetic powder) according to the present invention is made of a magnetic alloy containing at least Fe and/or Co and Pt and/or Pd.

This alloy is represented by the formula [$T_XM_{1-X}$] containing T and M in a composition ratio where X in the formula is in the range from 0.3 or greater to 0.7 or less, where T is one or two members of the group consisting of Fe and Co and M is one or two members of the group consisting of Pt and Pd, and the remainder is metallic elements other than T and M and impurities that are unavoidable from a production standpoint. The metallic elements other than T and M constitute no more than 30 at. % (including 0 at. %) of (T+M) as a percentage of atoms.

Regarding the value of X in [$T_XM_{1-X}$], X=0.5 is ideal as the composition for forming a face-centered tetragonal crystal. Even if X is in the range 0.3-0.7, it is possible to obtain a metal structure with face-centered tetragonal crystals in the range 10-100%. The metallic elements other than T and M include metallic elements that affect the phase transition (called the Z components) and metallic elements used as nucleating agents (called the N components), and the total amount of the Z components and the N components combined may be contained in an amount of no more than 30 at. % (including 0 at. %) of (T+M) as a percentage of atoms. Depending on the case, the content may be 20 at. % or less, or even 10 at. % or less, or even cases of 0 at. % may occur.

With respect to the Z components, affecting the phase transition means having the effect of reducing the crystal structure transition temperature ($T_t$) from the fcc structure to the fct structure at the time of the preparation of FePt particles by the polyol method. Specifically, by adding these Z salts, the Z metals precipitate at the crystal boundaries or grain boundaries when they are reduced to metal, thus exhibiting the aforementioned effect. Metallic elements that have such an effect include: Ag, Cu, Sb, Bi, Pb and others. Regarding the Z components, it is important for their salts to be reduced in polyol. The Z component content is preferably less than 30 at. % of the total amount of T and M If the percentage of atoms expressed as Z(T+M) is 30 at. % or greater, the Z components will be so excessive as to inhibit the appearance of the fct structure, so this is not preferable because rapid deterioration of the magnetic characteristics occurs. Note that the Z components are not mandatory, but rather the Z components need not be included if the fct structure is obtained even without the addition of Z components.

The N components are residual metallic elements other than T, M and Z that are derived from nucleating agents used during the production of this alloy. If the percentage of atoms expressed as N/(T+M) is 20 at. % or greater, the N components will be so excessive as to inhibit the appearance of the fct structure, so this is not preferable because rapid deterioration of the magnetic characteristics occurs. The nucleating agents that can be used during the production of this alloy may also be salts of the same metals as the metallic elements T, M and Z. The N components in this case will match one of the T, M or Z components so no N components other than the T, M or Z components will be included in the alloy composition. However, if a metallic component of the nucleating agent is the same as the metallic elements T, M or Z, as described later, then the T or M components which are the main constituent elements or the Z components which are the crystal structure transition temperature lowering elements, then metal salts other than their metal salts are used as the nucleating agent. Impurities and the like that are unavoidable at the time of production of the alloy according to the present invention are permitted to be contained as long as they do not have major effects on the characteristics. The content of permitted impurities is 5 wt. % or less, or preferably 2 wt. % or less, or even more preferably 1 wt. % or less.

The magnetic powder according to the present invention is characterized in that the alloy composition is very uniform among individual particles even though the particles are extremely fine. Here follows a detailed description of the characteristics of the alloy particles according to the present invention, but in order to simplify the description, FePt particles wherein T=Fe and M=Pt are used as an example. However, the cases of alloys using Fe instead of Co or Co instead of Pd are completely analogous, since FePt particles are simply examples.

The composition of individual particles of FePt can be analyzed using a technique called TEM-EDX (also called TEM-EDS). In a transmission electron microscope (TEM), energy dispersive x-ray analysis (EDX) using a nanoprobe electron beam can be used to narrow the range of measurement to 1-2 nm. For this reason, it is possible to perform analysis of the composition of individual particles as long as the FePt nanoparticles subject to measurement are dispersed at positions separated from each other. Examples of such a TEM-EDX measuring instrument include the Hitachi Transmission Electron Microscope (model HF-2000, acceleration voltage of 200 kV) and the TEM-EDX (NORAN Instruments, Inc., VANTAGE). Note that the term TEM-EDS used so far shall be treated as being included in TEM-EDX in this specification.

The average composition of the magnetic powder according to the present invention is obtained by performing ICP measurement on powder that has been completely dissolved in acid. In TEM-EDX measurement, it is possible to obtain the average composition by taking an average of the composition of each of the particles present within the field of view (1000 or more particles).

The present invention provides a FePt nanoparticle powder that substantially satisfies the conditions of Equation (1) and Equation (2) with respect to the average composition of the particles and composition of the individual particles.

$$0.90X_{av} \leq X_1, X_2, \ldots X_{100} \leq 1.10X_{av} \quad (1)$$

$$\text{standard deviation } \sigma \text{ of } X_1, X_2, \ldots X_{100} \leq 20\% \quad (2)$$

Here, $X_{av}$ represents the value of X in the composition formula $[T_XM_{1-X}]$ as actually measured in the assemblage of particles (the value of X in the average composition of the particle assemblage), and $X_1, X_2, \ldots X_{100}$ represent the values of X in the composition formula measured in individual particles in TEM-EDX measurement of the assemblages, for each of 100 particles $X_n$ selected arbitrarily when 1000 particles are in the field of view of measurement. Substantially satisfying the condition of Equation (1) means that the X components of each of 100 individual particles fall within a range of ±10% of the average value of the X component of the assemblage (powder). However, its use for applications such as in magnetic recording is permissible even if 5 or fewer out of 100 particles do not satisfy this condition. This is defined as "95 or more out of 100 particles satisfy the conditions of Equation (1)." Satisfying the condition of Equation (2) means that the standard deviation σ representing the degree of dispersion in the X component value of each of these 100 individual particles is kept within the range of 20%.

FIG. 1 is a binary equilibrium phase diagram of Fe and Pt. As seen in FIG. 1, one can see that the fcc→fct transition temperature for the structure transition changes as the composition differs. Accordingly, if the composition of the individual particles differs, even if annealing is performed at the same temperature, a phenomenon may occur wherein a certain particle may make the phase change to the fct structure but a certain other particle may not make the phase change (or may make only a partial phase change), so the magnetic characteristics may differ for each particle. In the worst case, even if Pt may be in the range 35-55 at. % in the average composition of the powder (the FePt range in FIG. 1), the Pt content may exceed this range in a certain particle. In this case, the particle will not undergo a phase change to the fct structure no matter how much heat is applied. In a magnetic recording application, fluctuations in the magnetic characteristics among individual particles in this manner become a fatal problem because write defects and loss of data and the like occur.

With the increase in magnetic recording density, in recent hard disks, the dimensions of a recording bit have become extremely miniaturized. This miniaturization has now approached the dimensions of a single crystal grain constituting the thin-film magnetic recording medium. For example, the surface area occupied by a recording bit is 0.063 µm² at a recording density of 10 Gbit/in.², 0.013 µm² at 50 Gbit/in.² and 0.0063 µm² at 100 Gbit/in.², and if the average crystal grain size of the magnetic film is assumed to be 15 nm, the number of crystal grains contained in one bit becomes roughly 278, 56 and 28, respectively (see the "Handbook" ibid. above). As the magnetic recording density increases in this manner, the uniformity of the characteristics of the individual particles becomes more important. Considering a density of 100 Gbit/in.², for example, if one particle among the 28 particles is nonmagnetic, then the signal output from that recording bit is reduced by 3.6%. If three particles among the 28 particles are nonmagnetic then the output is reduced by 10.7%. Such fluctuation in output increases the data error rate and causes write defects and loss of data, so it is not preferable for a high-density magnetic recording medium.

In the case of FePt particles, when considering the ratio of Fe to Pt, the fct structure that exhibits ferromagnetism does not result if Fe is outside the range 45-65 at. % (if Pt is outside the range 35-55 at. %). For this reason, in order to make the magnetic characteristics of the individual particles uniform, first the composition of the individual particles must be made uniform within this range, but even if the composition is within the range that gives rise to the fct structure, the fraction of the fct structure in the individual particles may in fact be different. If the fraction of the fct structure in the individual particles is different, then dispersion occurs in the magnetic characteristics of the individual particles. In addition, even if all of the particles have a monophase fct structure, if the fractions of Fe and Pt they contain, the so-called composition, is different, then their magnetocrystalline anisotropy constants and saturation magnetization and other magnetic characteristics become different. Ultimately, regardless of what sort of case is envisioned, dispersion in the composition of the individual particles is connected to dispersion in the magnetic characteristics of the individual particle. Thus, making the composition of the individual particles uniform is a mandatory requirement for their use in high-density magnetic recording media. However, with FePt nanoparticles, it is extremely difficult to obtain alloy particles that have a uniform composition in the individual particles with the prior art. With the present invention, when the alloy for FePt nanoparticles is prepared by the polyol method, this was found to be achievable if a nucleating agent is used to appropriately control the reduction reaction, so a FePt nanoparticle powder that is substantially satisfactory with regard to Equation (1) above and satisfies Equation (2) is provided.

Structure of the Magnetic Alloy

The magnetic alloy according to the present invention has a face-centered tetragonal (fct structure: ordered $L_{10}$ phase) fraction that is 10% or greater and 100% or less. Typically, the fraction within a metallographic structure having a certain metallic phase (the fraction of that crystal structure) is determined by comparing peak intensities in x-ray diffraction. However, in the FePt alloy to which the present invention applies, the x-ray diffraction patterns of the fcc (face-centered cubic) structure and fct (face-centered tetragonal) structure are nearly identical, and the (001) and (110) reflections obtained from the fct structure alone have extremely weak intensities, so it is difficult to perform a quantitative determination based on these peaks alone. However, the fct structure fraction can be calculated by means of analysis of the ferromagnetic structure of the FePt alloy measured by means of Mössbauer spectroscopy. In the present invention, the fct structure fraction of FePt particles is determined by analysis of the ferromagnetic structure by means of Fe atom Mössbauer spectroscopy, or namely by finding the fraction of the Fe atoms that are in magnetic order by means of Fe atom Mössbauer spectroscopy, and using this as the fct structure fraction.

If the fraction (volume %) with the fct or namely the face-centered tetragonal structure is less than 10 vol. %, then the magnetic anisotropy becomes small and the coercivity and thermal stability required of magnetic recording material is not obtained. With the write magnetic field of the write head of a certain magnetic recording apparatus, there are cases in which writing is impossible with a magnetic recording material that has excessively high coercivity. At such time, it is sufficient to adjust the fct structure fraction so that this writing is possible and adequate coercivity is exhibited. In heat-assisted magnetic recording or other magnetic recording schemes wherein the medium is first heated to above the Curie temperature and then writing is performed, there is no problem even if the fct structure is 100 vol. %. For strong permanent magnet applications, a 100% fct structure is better. The face-centered tetragonal (fct) fraction of the magnetic powder according to the present invention is 10-100% as a volume fraction, preferably 20-100%, or even more preferably 40-100%, and in certain cases 50-100% or even 60-100%, so the dispersion in the fct fraction among individual particles is small, and thus it is possible to satisfy these requirements adequately.

Grain Size

The magnetic powder according to the present invention has an average value of the grain size of the primary particles ($D_{TEM}$) when observed by transmission electron microscope (TEM) that is 30 nm or less, or preferably 20 nm or less. The primary particles refer to the smallest units of particles that cannot be divided any further. With a FePt particle powder that has the fct structure and that is prepared according to the present invention, at the stage at which the alloy particles are prepared and recovered as a powder, the static magnetic field effect acts among the particles which are primary particles, so the particles are often present as a group of a large number of primary particles. Specifically, a large number of primary particles collectively form a single group, and the large number of particles in this group readily forms a dispersed state. One group consisting of a large number of primary particles is called a secondary particle. These secondary particles may have various grain sizes depending on the conditions of the preparation reaction; there are cases in which they reach roughly 100 μm or so. However, even if such a secondary particle is formed, as a whole it constitutes a powder that has fluidity.

The present inventors discovered that if a FePt particle powder in which secondary particles are present immediately after preparation is subjected to an appropriate dispersion treatment in the presence of an appropriate surfactant or other dispersing agent, then the primary particles can be put into a state in which they are dispersed at a stipulated distance from each other. Details of this method will be described later. In the measurement of the average grain size in TEM observation, if one performs the measurement in the state when dispersed by this method, the average grain size of the primary particles can be measured accurately.

When a FePt particle powder is used in magnetic recording, the grain size of these particles has an intimate relationship with the recording density. The recording density can typically be increased the smaller the grain size. The FePt particle powder according to the present invention has an average value of the grain size of the primary particles ($D_{TEM}$) when observed by transmission electron microscope (TEM) of 30 nm or less, and preferably 5 nm or greater, and suitable for use in magnetic recording on this point also.

X-ray Crystal Grain Size (Dx)

The magnetic powder according to the present invention has a crystal grain size D of 4.0 nm or greater, or preferably 5.0 nm or greater and even more preferably 6.0 nm or greater. The crystal grain size of FePt particles can be determined by the Scherrer formula from the results of x-ray diffraction. For this reason, the crystal grain size of FePt particles shall be referred to as the x-ray crystal grain size (Dx). The method of determining this is as follows.

The Scherrer formula can be represented by the following general formula.

$$D = K \cdot \lambda / \beta \cos \theta$$

Here, K is the Scherrer constant, D is the crystal grain size, λ is the wavelength of the x-rays, β is the width at half maximum of the peak obtained from x-ray diffraction, and θ is the Bragg angle of the diffracted beam.

In the working examples presented later, 0.94 is used as K and Cu is used for the x-ray tube. Thus, the formula above can be rewritten as follows.

$$D = 0.94 \times 1.5405 / \beta \cos \theta$$

As the peak for the FePt-based alloy for which D is to be found by this formula, it is possible to use one with (111) observed near 41°.

The origin of the magnetic anisotropy of the FePt particles derives from the crystal structure, so it is typically called magnetocrystalline anisotropy. The strength of this magnetocrystalline anisotropy and the stability of magnetization are determined by the crystallinity of the particles and the crystal grain size. Regarding the stability of magnetization of FePt particles when in the fct structure, if the x-ray crystal grain size (Dx) is too small, the effect of the disturbance of spin due to heat becomes prominent, resulting in the state of superparamagnetism that does not hold magnetization. For this reason, the x-ray crystal grain size (Dx) must have a value above a certain fixed magnitude.

The present inventor discovered that the x-ray crystal grain size (Dx) of the FePt particles according to the present invention is controllable, and moreover, as a result of determining the relationship between the x-ray crystal grain size (Dx) and the magnetic characteristics, it was found that a FePt particle powder that has good magnetic characteristics can be obtained by making the x-ray crystal grain size (Dx) 4.0 nm or greater, or preferably 5.0 nm or greater and even more preferably 6.0 nm or greater.

Figure 3:
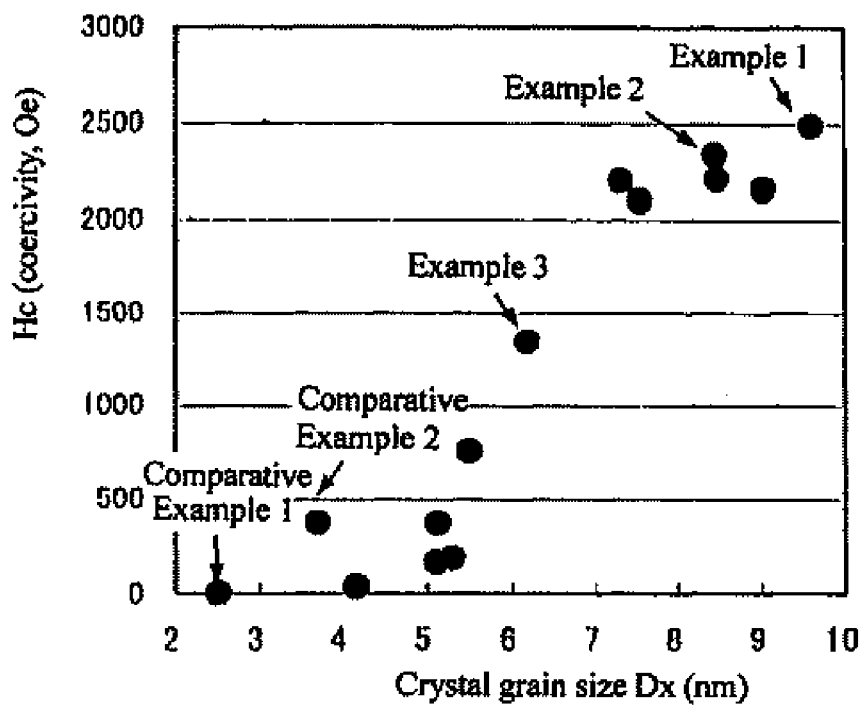
FIG. 3 is a graph of the coercivity as a function of the x-ray crystal grain size ($D_X$) of magnetic powder according to the present invention.
Figure 4:
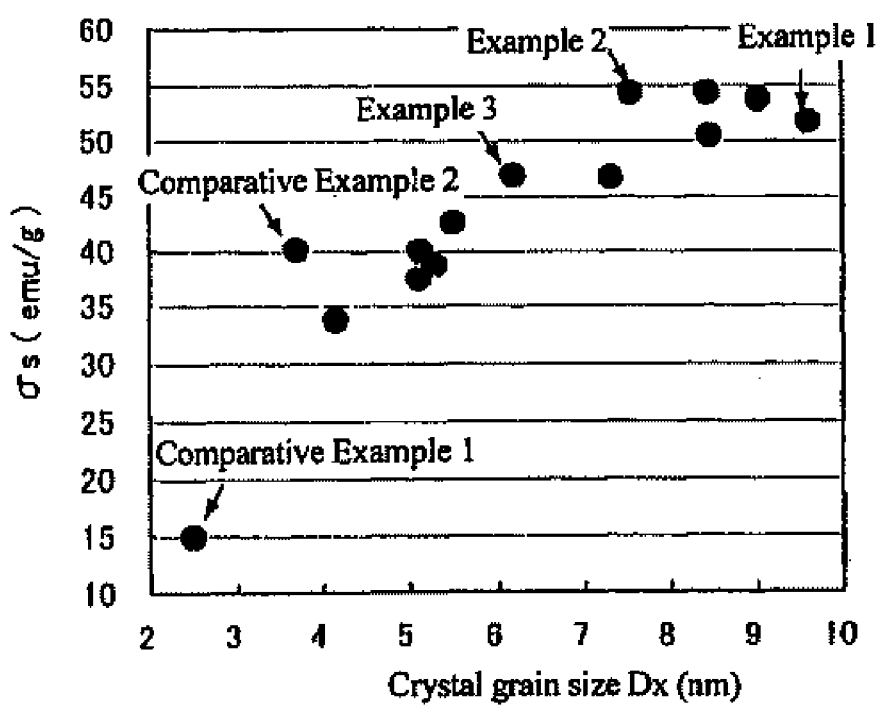
FIG. 4 is a graph of the saturation magnetization as a function of the x-ray crystal grain size ($D_X$) of magnetic powder according to the present invention.

While the details will be presented in the working examples, as shown in FIG. 3, if the x-ray crystal grain size (Dx) of FePt particles becomes greater than 4.0 nm, the coercivity becomes concomitantly greater, and in addition, as shown in FIG. 4, if the x-ray crystal grain size (Dx) becomes greater than 4.0 nm, the saturation magnetization ($\sigma_s$) was also found to become concomitantly greater. Thus, based on this knowledge, the x-ray crystal grain size (Dx) of the FePt particle powder is stipulated to be 4.0 nm or greater.

Magnetic Characteristics

The FePt particle powder according to the present invention has a fct structure and there is no dispersion in the composition and structure of the individual particles, and moreover it has a x-ray crystal grain size (Dx) of 4.0 nm or greater, so it has a coercivity (Hc) at room temperature of 100 Oe or greater, or preferably 1000 Oe or greater, or even more preferably 1500 Oe or greater. In a magnetic recording application, the coercivity (Hc) is preferably 1000 Oe or greater.

It has a saturation magnetization $\sigma_s$ of 20 emu/g or greater, preferably 30 emu/g or greater and more preferably 40 emu/g or greater. If magnetic powder for use in magnetic recording has a saturation magnetization $\sigma_s$ less than 30 emu/g, then the written information may be too weak and cannot be read even with a very sensitive head. If the FePt particle powder according to the present invention has an x-ray crystal grain size (Dx) of 3 nm or greater, then its saturation magnetization $\sigma_s$ becomes 30 emu/g or greater.

If the magnetism of the magnetic powder is too weak, even permanent magnets and magnetic fluids will suffer from a weak motor torque or poor pressure resistance in the shaft seal. The magnetic powder according to the present invention has a $\sigma_s$ value of 20 emu/g or greater, so it is suitable to these applications also. In vivo molecular markers and drug carriers are difficult to detect from outside the body if the $\sigma_s$ is less than 20 emu/g. This is not the case with the magnetic powder according to the present invention, so it is also suitable to these applications.

The squareness SQ (ratio of remanence to saturation magnetization) of the magnetic powder according to the present invention is 0.30 or greater, or preferably 0.40 or greater. In addition, the SFD of the magnetic powder according to the present invention is 1.1 or less, or preferably 1.0 or less. Having a large SQ and a small SFD in this manner means that the dispersion in magnetic characteristics among the individual particles is small. This means that it is a magnetic material that is particularly suited for use in high-density magnetic recording.

Method of Production

The magnetic powder according to the present invention may be produced by dissolving metal salts containing the T components and M components in a solution of polyol and/or derivatives thereof with a boiling point of 150° C. or greater, reducing these metal salts with the solution of polyol and/or derivatives thereof with the solution at a temperature of 150° C. or greater in an inert gas atmosphere, but in this method of preparing these alloy nanoparticles by reduction (the polyol method), the powder may be advantageously produced by adopting the following characteristic means (a), (b), (c) and (d) either singly or in combination.

(a). Maintain this reduction reaction at a pressure higher than atmospheric pressure (Working Examples 1-3).

(b). Control the heat-up rate until reaching the reduction temperature (strictly speaking, the average heat-up rate until reaching 50-150° C.) to 0.2° C./minute or greater and 20° C./minute or less (Working Examples 1-3).

(c). Cause the reduction reaction to progress in the presence of a nucleating agent for this alloy (Working Example 4).

(d). Use a surfactant or coupling agent to perform surface treatment of the FePt particle powder thus prepared, thereby making it into an assemblage of individual particles that are dispersed at a stipulated distance from each other (Working Examples 5-10).

These means (a)-(d) will be described below, but the polyol method which is the premise for them will be described first.

Polyol Method

The gist of the polyol method is to dissolve metal salts containing the T components and M components in polyol and use the polyol to reduce the T components and M components to metal and thus obtain alloy particles with the formula $[T_xM_{1-x}]$ (where X is in the range 0.3-0.7). The polyol used in the present invention is preferably ethylene glycol, triethylene glycol or tetraethylene glycol. However, this is not a limitation, since as long as it is a polyol with a boiling point of 150° C. or greater or a derivative thereof, it can be used in the present invention. In addition, it is possible to use not only one polyol with a boiling point of 150° C. or greater or a derivative thereof, but also a mixture of two or more polyols.

The metal raw materials to be dissolved in polyol are preferably metal complexes, and more preferable acetylacetonate complexes. In the case of FePt particles, the Fe and Pt can be supplied by iron(III) acetylacetonate and platinum(II) acetylacetonate. In fact, after these iron(III) acetylacetonate and platinum(II) acetylacetonate are completely dissolved in polyol, the solution is heated in the reflux state in an inert gas atmosphere to a temperature of 150° C. or greater or preferably 270° C. or greater, to allow the reduction reaction to proceed. If the metal salts are not completely dissolved before heat-up and residual solids remain, this is not preferable because would become a cause of dispersion in the composition or metal structure inside or outside of the individual particles thus prepared.

In this preparation reaction, it is important to control the reaction rate accurately. As a method of doing so, it is important to adjust the metal concentration within the solvent. Specifically, by suppressing the concentration of the metal raw materials, it is possible to reduce supersaturation of the metal thus produced, thereby decreasing the rate of nucleation and particle growth. The molar ratio of polyol and all metal ions contained in the polyol, namely the molar ratio of polyol/all metal ions had best be 100 or greater.

If components that act to reduce the crystal structure transition temperature ($T_t$) from the fcc structure to the fct structure (Z components) as described above are to be included in this alloy, then salts of the Z components that can be reduced in polyol should be dissolved in the solution to undergo the polyol method. Thereby, the metal salts of the Z salts are also reduced to the Z metals in polyol, and thus these metal components are segregated to the grain boundaries of the $[T_xM_{1-x}]$ alloy and supply the function of reducing $T_t$. For this reason, when the face-centered tetragonal fraction is to be increased by annealing after a FePt particle powder with a low face-centered tetragonal fraction is produced by the polyol method, it is effective to add Z salts in the polyol method. However, in the case that it is possible to prepare a FePt particle powder with an adequate amount of fct structure by simply reducing with the polyol method, the addition of this Z salt is not necessarily necessary.

Means (a) above: Pressurized Reduction

Non-Patent Document 2 describes how a FePt particle powder with a coercivity of 370 Oe is obtained by means of a reduction reaction under atmospheric pressure. The present inventor discovered that if these metal salts are reduced in this polyol and/or derivatives thereof while maintaining the reduction reaction by the polyol method at a pressure in excess of atmospheric pressure, it is possible to produce FePt particles with an even higher coercivity of 500 Oe or greater, for example. The pressure in excess of atmospheric pressure refers to a pressure that is more than 5 Pa higher than atmospheric pressure, or preferably a pressure 10 Pa higher than atmospheric pressure, or even more preferably 100 Pa higher than atmospheric pressure. Even if the pressure is increased above atmospheric pressure, if the pressure difference is less than 5 Pa, it is difficult to stably obtain a FePt particle powder that has a coercivity of 500 Oe or greater. On the other hand, if the pressure is too high, e.g. a pressure 10000 Pa higher than atmospheric pressure, then not only does the effect of increasing the coercivity approach saturation, but also the reaction apparatus requires a thoroughly pressure-resistant structure, so this is not economical. Accordingly, the pressure difference from atmospheric pressure is to be kept at 10000 Pa or less, or preferably a pressure difference of 5000 Pa or less. The reaction temperature at that time is preferably 270° C. or greater, and thus it is possible to stably produce a FePt particle powder that has a fct structure fraction of 10 vol. % or greater. However, if the reaction temperature becomes excessively high, then boiling of the solvent becomes intense, so the temperature is to be 400° C. or less or preferably 350° C. or less.

The magnetic anisotropy field $H_k$ of the FePt particles obtained by the preparation reaction also varies with the reaction time. Typically, $H_k$ increases with increasing reaction time. For this reason, in order to obtain a sufficiently high $H_k$, the reaction time is to be 1 hour or longer, preferably 2 hours or longer and even more preferably 3.5 hours or longer. It is preferable that the pressurized state described above be maintained during this reaction time.

Means (b) above: Heat-up Rate

The present inventor found that, in the reduction reaction based on the polyol method described above, manipulating the heat-up rate before the reduction temperature is reached will change the x-ray crystal grain size (Dx) of the prepared alloy particles. Moreover, the magnetic characteristics of the prepared alloy particles were found to be greatly dependent on their x-ray crystal grain size (Dx). Specifically, in order to obtain a FePt nanoparticle powder with a x-ray crystal grain size (Dx) of 4 nm or greater, under the pressure and temperature conditions described above, the heat-up rate is to be adjusted in the range 0.2-20° C./minute, or preferably 1-20° C./minute. If a heat-up rate outside of this range is adopted, then it is difficult to stably obtain powder with an x-ray crystal grain size (Dx) of 4 nm or greater. In addition, if the heat-up rate is slower than 0.2° C./minute, then this is not preferable from the standpoint of productivity. Here, the heat-up rate referred to in the present invention is strictly speaking the average rate of the temperature increase (° C./minute) from 50° C. to 150° C. In practice, at the point in time when the final target reaction temperature is neared, for example, when the temperature has reached roughly 20° C. lower than the final target temperature, it is preferable for the heat-up rate to be reduced so that the temperature is increased slowly up to the target temperature so that the actual temperature does not exceed the target reaction temperature.

Means (c) above: Nucleating Agents

The present inventor discovered that if the reduction reaction according to the above polyol method is performed using a nucleating agent, dispersion in the composition of the individual alloy particles thus prepared is eliminated, and it is thus possible to suppress fluctuations among individual particles in the composition and structure and even the magnetic characteristics. Specifically, the present inventor was able to pinpoint the fact that the use of a nucleating agent is the key to reducing dispersion in composition among particles.

The nucleating agent used in the present invention is a salt of the metal components N as described above. The N components may or may not be identical to the T components or M components. If they are identical, their salts are not to be identical. Specifically, a metal salt of a different type than the metal salts of the T components or M components of the alloy raw materials subject to reduction (but a salt that is soluble in polyol) is used as the nucleating agent. If they are not identical, then Au, Ag, Ru, Rh, Pd, Os, Ir or other metals may be used as these N components, for example, and a salt thereof that is soluble in a polyol solution may be used as the salt.

When N is different from T or M, the amount of nucleating agent used is to be an amount such that Z(T+M) as a percentage of atoms is in the range 0.01-20 at. %. When N is the same as T or M, T and M are used in an amount such that X in the formula $[T_xM_{1-x}]$ is in the range from 0.3 or greater to 0.7 or less, but the amount of T or M in the nucleating agent as a fraction of T+M in the alloy raw material is to be 0.01 at. % or greater and 20 at. % or less. If the amount of nucleating agent used is less than 0.01 at. %, then the effects of reducing dispersion in the composition of individual particles and improving the reproducibility of the reaction are not seen. If nucleating agent is added in excess of 20 at. %, this is not preferable because the blocking of crystal growth or other deleterious effects are greater.

In the use of nucleating agent, it is realistic to add the nucleating agent to the raw material solution formed by dissolving the T components and M components in polyols. The timing of addition is preferably when the temperature of the raw material solution is 150° C. or less. If 150° C. is exceeded, then there is a possibility that a portion of the iron(III) acetylacetonate and platinum(II) acetylacetonate which are the main raw materials for the FePt particles will be reduced so that metal nuclei will have already been generated, so the addition of a nucleating agent may induce the formation of secondary nuclei and as a result, this will not contribute to the homogenization of particles such as the uniformity of the compositions of individual particles and the like.

The nucleating agent is preferably easily reduced by the reduction reaction in the polyol method. Typically, the metal components (N components) within the nucleating agent are preferably ones that have a value of the standard electrode potential of Ag or greater. Examples of these typical N components include Au, Ag, Ru, Rh, Pd, Os, Ir and Pt. When the nucleating agent is further dissolved in the raw material solution formed by dissolving the T components and M components in polyol, and this solution is heated up to a temperature of 150° C. or greater or preferably 270° C. or greater in an Ar, He or other inert gas atmosphere, the metal ions of the N components used as the nucleating agent are preferably reduced to metal by polyol in solution at a temperature of 150° C. or less, or preferably 100° C. or less. For this to occur, when the nucleating agent is added as a metal salt, it is necessary to select the metal salt so that it will be reduced by this polyol at a temperature of 150° C. or less. Chlorides, nitrates, sulfates and other salts of Au, Ag, Ru, Rh, Pd, Os, Ir and Pt are readily reduced under these conditions and are thus suitable as the nucleating agent according to the present invention. Examples of chlorides include gold chloride, palladium chloride, chloroplatinic acid and others.

Even metal salts that are not readily reduced at 150° C. or less may be first dissolved in polyol and reduced to metal at a temperature in excess of 150° C., and then the polyol with the reduced metal suspended as nuclei can be used as a nucleating agent. In this case also, it is preferably added at a temperature of 150° C. or less to the raw material solution in which the T components and M components are dissolved.

In any case, at the time of adding a nucleating agent to the raw material solution in which the T components and M components are dissolved, it is best to add it at such a low temperature that reduction does not occur and dissolve it completely, or add it all at once when it is added at a temperature at which reduction will occur. Continuous addition or batch addition or other methods in which it is added over time are not preferable. The reason why is because, although this depends on the temperature at the time of addition, the growth of nuclei generated by the previously added nucleating agent will occur simultaneously with the generation of new nuclei by the nucleating agent added later, thus causing dispersion to occur in the composition of the individual particles.

When a nucleating agent is used appropriately as such, the FePt particles thus prepared have a sharp distribution in composition among the individual particles, so a FePt particle powder consisting of particles with a uniform composition can be produced. Specifically, it was found that by using a nucleating agent, it is possible to control the timing of the generation of uniform nuclei, and as a result, the distribution of compositions of the particles thus produced and the distribution of the magnetic characteristics, crystal grain size, particle size and other characteristics become sharp, and thus uniform particles can be produced.

Although the reason why the introduction of a nucleating agent improves the uniformity of composition among individual particles is not necessarily known clearly, the general thinking is as follows. In cases in which no nucleating agent is present, there is no clear separation between the nucleation stage and the crystal growth stage in the heat-up process, so even after nuclei are first formed, the generation of secondary nuclei also occurs, and as a result, the distribution of particle sizes and crystal grain sizes becomes broader. In addition, in cases in which no nucleating agent is present, it is thought that with FePt particles, the readily reduced Pt may be reduced alone and may not alloy well with Fe, or an alloy with a different composition may be prepared. In contrast, when a nucleating agent is introduced, the nucleation stage and the crystal growth stage are separated in the heat-up process, and as a result not only will particles with a constant grain size and crystal grain size be generated but also an alloy with a constant composition of Fe and Pt is grown from innumerable nuclei generated nearly simultaneously.

Means (d) above: Dispersed Fluid

The present inventor discovered an advantageous method of dispersing assemblages of alloy particles prepared by the polyol method in the state of primary particles. The gist of this method comprises:

a step of preparing an amalgamation formed by amalgamating a group of alloy particles (P) that have an average grain size of 30 nm or less, a fluid organic medium (A) and an organic medium (B) that are mutually phase-separated, and an organic medium (C) as a surfactant;

a step of subjecting this amalgamation to forced agitation or shaking, thus forming a suspension wherein particles (CP) with organic medium (C) adhered to the surface of the particles (P) are suspended;

a step of subjecting this suspension to settling or centrifugation, thus performing phase separation between a phase (the A phase) having as its main component the organic medium (A) with a relatively small amount of the particles (CP) suspended therein, and a phase (the B phase) having as its main component the organic medium (B) with a relatively large amount of the particles (CP) suspended therein;

a step of recovering the B phase in this phase-separated state; and a step of drying, if necessary, the organic medium (B) from the B phase thus obtained by a stipulated amount. With this method, it is possible to obtain an assemblage of magnetic metal particles (FePt particles) where the individual particles are monodispersed at stipulated distances from each other.

The organic medium (A) and organic medium (B) used in this method are phase-separated from each other. The organic medium (A) may be the post-reaction solution obtained when FePt particles (P) containing the fct structure are prepared directly by the polyol process, and in this case, groups of FePt nanoparticles are present in the post-reaction solution. This post-reaction solution typically contains various components. In the experience of the present inventor, upon using TG-DTA to measure the loss of this post-reaction solution due to heating, residue of roughly 20% was measured even when heated up to 400° C. The solution containing such high-boiling-point components is difficult to handle thereafter. In addition, if it contains large amounts of metal ions and other impurities, then it is difficult to use as magnetic material for use in high-density magnetic recording, but such post-reaction solution containing high-boiling-point components and metal ions and the like can be used effectively, because the amount moved to the B phase side based on the method of production described above becomes smaller.

If such an alcohol-based organic liquid is organic medium (A), then it is best to use an organic medium that has a water solubility of less than 1 wt. % and a boiling point of less than 200° C. as organic medium (B). Examples of such an organic medium (B) include hexane, cyclohexane, benzene, toluene, xylene, chloroform and others. This organic medium (B) is ultimately readily dried by heating and/or depressurization, and the water solubility is low, so it is possible to use water to rinse impurities from within medium (B).

The organic medium (C) used in this method is a surfactant; examples of such include surfactants consisting of organic compounds that have amine groups, amide groups and azo groups including N atoms that are readily adhered to the surface of the metal particles, along with surfactants made of organic compounds that contain either thiol groups or carboxyl groups in their structure.

In the above method, the B phase thus recovered is in the state in which the surfaces of the individual particles are coated with surfactant (C) to a stipulated thickness, and because of the effects of solvent affinity of the surfactant and static repulsive forces, the C-coated particles (CP) are dispersed within the (B) solution due to the reaction forces among particles. Ideally, when the (B) solution is removed by evaporation, the surfactant (C) becomes a steric hindrance and thus prevents the particles from coming into contact, and thus is obtained an assemblage of FePt nanoparticles wherein the individual particles are dispersed and maintain a stipulated distance from each other due to the surfactant (C) that is present on the surface of the individual particles. If this is added again to the organic medium (B), it is possible to restore it to a suspension wherein the particles are suspended within the solution due to the reaction forces among particles.

The monodispersion of these particles is achieved by covering the surfaces of the individual particles with surfactant, so the FePt particles are dispersed within a dispersion medium at a distance of preferably 1 nm or greater between particles. The concentration of FePt particles in the dispersion medium is preferably $1.0 \times 10^{-5}$ vol. % or greater and 40 vol. % or less. The dispersion medium preferably consists of an organic liquid (B) that has a water solubility of less than 1 wt. % and a boiling point of 200° C. or less and a surfactant (C). At this time, upon measuring the average grain size of the FePt particles by means of the dynamic light-scattering method, this is to be 30 nm or less and preferably 10 nm or less.

As a different method, by coating the surface of the FePt particle surface with a silane coupling agent, titanate coupling agent, aluminate coupling agent or other coupling agent, it is possible to produce assemblages of FePt particles that have fluidity in the state of being dispersed at a distance from each other, and in certain cases, it is possible to make them assemblages of FePt particles wherein their positions are fixed in the state of being dispersed at a distance from each other.

If hydrolysis is performed in the state in which the coupling agent is adsorbed to the surface of the particles, for example, it is possible to form an Si oxide layer, Ti oxide layer or Al oxide layer upon the surface of the metal particles. If such an oxide layer is present on the surface, this prevents the particles from being sintered together even if annealing is performed. Thus, the particles are prevented from being sintered together when annealing is performed in order to achieve a phase transition to the fct structure, and thus it is possible to obtain an assemblage of particles with the fct structure that are dispersed at a distance among the particles.

Annealing

If the FePt particle powder prepared by the polyol method is predominantly fcc in structure, for it to be applied to magnetic recording, annealing must be performed at a temperature above $T_t$ to achieve a phase transition to a FePt particle powder that has a predominantly fct structure. The present inventor found that if the FePt particle powder thus prepared is dispersed as described above and annealing is performed in this state, then an assemblage in the dispersed state is obtained even after annealing. If the fraction that is fct in structure after the reduction reaction based on the polyol method is relatively small, or a FePt particle powder with the fcc structure is produced, then this powder can be annealed in the dispersed state as described above, thereby producing assemblages of particles that are predominantly fct in structure and where the individual particles are dispersed at a distance from each other. This annealing can also be performed in the state in which the FePt particle powder thus prepared is dispersed upon a substrate or other surface. Thereby, it is possible to obtain individual particles with an fct structure disposed upon a substrate at a stipulated distance.

In the case of FePt particles containing the Z components described previously, this can reduce the annealing temperature. Thus, in the case that the fct structure fraction of the FePt particle powder prepared by the polyol method is low or in the case that it has an fcc structure, this is advantageous for preparing FePt particles that contain the Z components.

With the present invention in this manner, it is possible to provide a FePt particle powder that is suitable for constructing a high-density magnetic recording medium. This FePt particle powder can be suitably used not only for such a magnetic recording material but also for use in nano-scale electronics, permanent magnet materials, bio-molecular markers, drug carriers and the like.

WORKING EXAMPLES

Example 1

To 200 mL of tetraethylene glycol (boiling point: 327° C.), 1.37 mmol/L of iron(III) acetylacetonate and 1.21 mmol/L of platinum(II) acetylacetonate were added and dissolved until no solid residue of iron(III) acetylacetonate and platinum(II) acetylacetonate remains. This solution was transferred to a container with a reflux condenser attached and placed in an oil bath. Inert gas consisting of nitrogen was blown into the container at a flow rate of 400 mL/minute while the solution was heated and agitated at a speed of 160 rpm. Refluxing was performed for 5 hours at a temperature of 300° C. and the reaction was halted. At this time, the heat-up rate was set to 15° C./minute. In addition, an exhaust pipe with a pressure-regulating valve was attached to the gas exhaust port of the vessel, and by adjusting the opening of this regulating valve, the pressure within the container was kept constant at a pressure 3100 Pa higher than atmospheric pressure during the reaction.

After the reaction was complete, methanol in an amount three times that of the solution was added and the solution was centrifuged and the supernatant solution was removed. To the residue (particle powder) remaining after removal of the supernatant solution was added 100 mL of methanol and the mixture was placed in an ultrasonic cleaning tank, where the particle powder was dispersed in this ultrasonic cleaning tank. The dispersion liquid thus obtained was centrifuged and then the supernatant solution was removed. The same operation of adding methanol to the residue (particle powder) thus obtained and then processing in the ultrasonic cleaning tank and centrifuge was repeated two more times. The substance containing FePt nanoparticle powder that was obtained after separating the supernatant solution for the last time was subjected to transmission electron microscopy (TEM), x-ray diffraction (XRD), composition analysis and measurement of magnetism (VSM). At the time of TEM observation, the substance containing FePt nanoparticle powder was placed in hexane and oleic acid and oleylamine were added as surfactants and the substance was subjected to measurement in the state of a disperse solution obtained by ultrasonic dispersion.

As a result, the average grain size of the primary particles as observed by transmission electron microscopy (TEM) was found to be 8.4 nm. As a result of x-ray diffraction, diffraction peaks corresponding to the superlattice reflections (001) and (110) were observed and face-centered tetragonal crystals were confirmed to be present. The x-ray crystal grain size (Dx) was 9.6 nm. The result of composition analysis was an atomic ratio of Fe:Pt=52:48.

Figure 2:
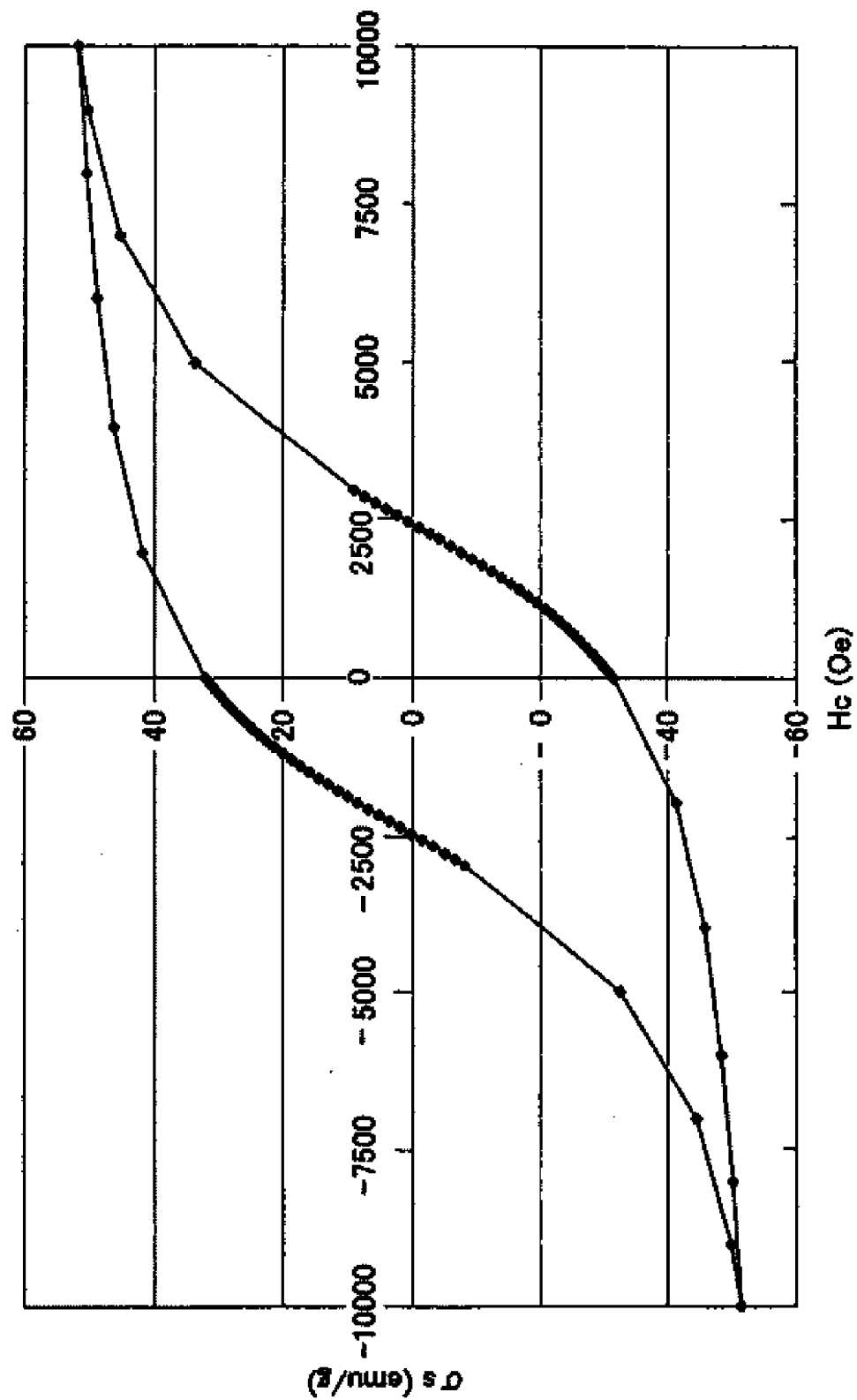
FIG. 2 is a graph showing an example of the magnetic characteristic (hysteresis loop) of magnetic powder according to the present invention.

FIG. 2 shows the hysteresis loop of the FePt nanoparticle powder obtained from this example, and as shown in FIG. 2, the results of coercivity Hc=2485 Oe, saturation magnetization $\sigma_s$=52 emu/g, squareness SQ=0.620 and SFD=0.860 were obtained. In addition, the fct structure fraction obtained by Mössbauer spectroscopy of Fe atoms was 58%.

Example 2

Example 1 was repeated except that the heat-up rate was set to 12° C./minute. As a result, the average grain size of the primary particles as observed by transmission electron microscopy (TEM) was found to be 8.2 nm. As a result of x-ray diffraction, diffraction peaks corresponding to the superlattice reflections (001) and (110) were observed and face-centered tetragonal crystals were confirmed to be present. The x-ray crystal grain size (Dx) was 8.4 nm. Composition analysis gave an atomic ratio of Fe:Pt=52:48. The results of measurement of magnetism were coercivity Hc=2336 Oe, saturation magnetization $\sigma_s$=54 emu/g, squareness SQ=0.620 and SFD=0.880. In addition, the fct structure fraction obtained by Mössbauer spectroscopy of Fe atoms was 56%.

Example 3

Example 1 was repeated except that the heat-up rate was set to 2° C./minute. As a result, the average grain size of the primary particles as observed by transmission electron microscopy (TEM) was found to be 7.9 nm. As a result of x-ray diffraction, diffraction peaks corresponding to the superlattice reflections (001) and (110) were observed and face-centered tetragonal crystals were confirmed to be present. The x-ray crystal grain size (Dx) was 6.2 nm. Composition analysis gave an atomic ratio of Fe:Pt=52:48. The results of measurement of magnetism were coercivity Hc=1340 Oe, saturation magnetization $\sigma_s$=47 emu/g, squareness SQ=0.490 and SFD=1.08. In addition, the fct structure fraction obtained by Mössbauer spectroscopy of Fe atoms was 32%.

Comparative Example 1

Example 1 was repeated except that the heat-up rate was set to 0.1° C./minute. As a result, the average grain size of the primary particles as observed by transmission electron microscopy (TEM) was found to be 6.8 nm. The x-ray crystal grain size (Dx) was 2.5 nm. Composition analysis gave an atomic ratio of Fe:Pt=52:48. The results of measurement of magnetism were coercivity Hc=2 Oe, saturation magnetization $\sigma_s$=14.9 emu/g and squareness SQ=0.003. In addition, the fct structure fraction obtained by Mössbauer spectroscopy of Fe atoms was 0%.

Comparative Example 2

To 100 mL of tetraethylene glycol (boiling point: 327° C.), 2.539 mmol/L of iron(III) acetylacetonate and 1.269 mmol/L of platinum(II) acetylacetonate were added and dissolved until no solid residue of iron(III) acetylacetonate and platinum(II) acetylacetonate remains. This solution was transferred to a container with a reflux condenser attached and placed in an oil bath. Inert gas consisting of nitrogen was blown into the container at a flow rate of 400 mL/minute while the solution was heated and agitated at a speed of 160 rpm. Refluxing was performed for 3.5 hours at a temperature of 300° C. and the reaction was halted. At this time, the heat-up rate was set to 10° C./minute. The pressure within the container was not regulated but rather it was kept at atmospheric pressure.

After subjecting the reaction product thus obtained to the same processing as in Example 1, the product was similarly measured and as a result, the average grain size of the primary particles as observed by transmission electron microscopy (TEM) was found to be 7.5 nm. In x-ray diffraction, diffraction peaks corresponding to the superlattice reflections (001) and (110) were observed and face-centered tetragonal crystals were confirmed to be present. The x-ray crystal grain size (Dx) was 3.7 nm. In composition analysis based on TEM-EDX, the composition ratio of Fe and Pt was an atomic ratio of Fe:Pt=55:45. In the measurement of magnetism, coercivity Hc=370 Oe, saturation magnetization $\sigma_s$=40 emu/g, squareness SQ=0.25 and SFD=1.10. When the FePt nanoparticle powder obtained according to this example was subjected to Mössbauer spectroscopy, the fct structure fraction obtained by Mössbauer spectroscopy of Fe atoms was 38%.

FIGS. 3-6

Figure 5:
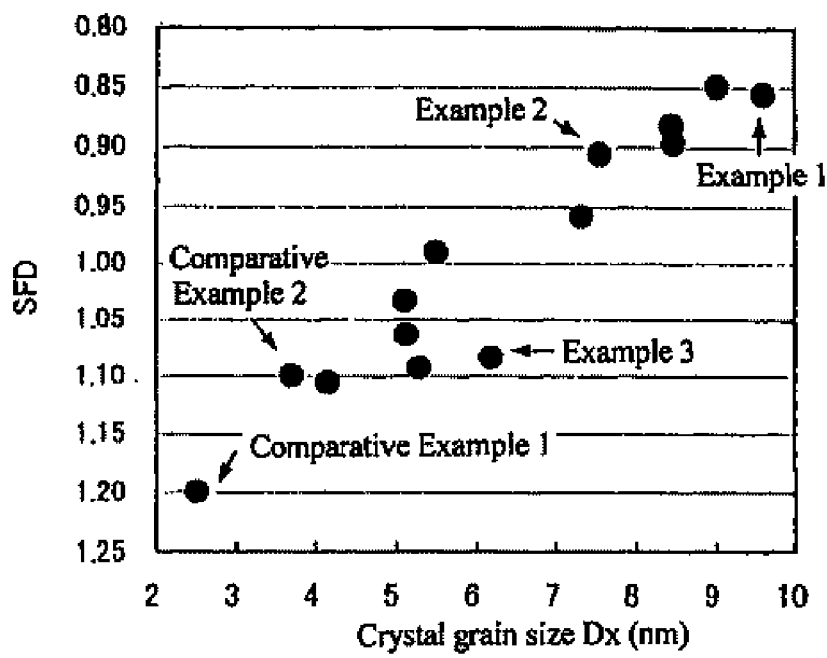
FIG. 5 is a graph of the SFD as a function of the x-ray crystal grain size ($D_X$) of magnetic powder according to the present invention.

FIGS. 3-5 are graphs of the magnetic characteristics as a function of the x-ray crystal grain size (Dx) of the products of Examples 1-3 and Comparative Examples 1-2, along with many substances containing FePt nanoparticle powder obtained by varying the reaction conditions (particularly the heat-up rate) using the same raw materials. Based on these results, one can see that the magnetic characteristics of the FePt nanoparticle powder are closely correlated to its x-ray crystal grain size (Dx). In particular, from FIG. 3, one can see that as the x-ray crystal grain size (Dx) becomes larger than 4.0 nm, the coercivity becomes concomitantly higher. From FIG. 4 also, one can see that as the x-ray crystal grain size (Dx) becomes larger than 4.0 nm, the saturation magnetization ($\sigma_s$) becomes concomitantly higher. From FIG. 5, while the correlation between SFD and x-ray crystal grain size (Dx) is not necessarily clear, as long as the x-ray crystal grain size (Dx) is 6 nm or greater, the coercivity distribution (SFD) is shown to settle down to a stable value of not greater than 1.

Materials for use in magnetic recording preferably have a coercivity Hc of 1000 Oe or greater, and while the FePt particle powder obtained according to Examples 1-3 of the present invention falls within this range, those from Comparative Examples 1 or 2 are outside this range. From FIG. 3, one can see that if the x-ray crystal grain size (Dx) is 5.5 nm or greater, the coercivity Hc is 1000 Oe or greater and if 6.0 nm or greater, then it is stably above 1000 Oe.

Similarly, materials for use in magnetic recording preferably have a saturation magnetization $\sigma_s$ of 30 emu/g or greater, and while the FePt particle powder obtained according the Examples of the present invention falls within this range, that from Comparative Example 1 is outside this range. From FIG. 4, one can see that if the x-ray crystal grain size (Dx) is roughly 3.0 nm or greater, the saturation magnetization $\sigma_s$ is 30 emu/g or greater and if 4.0 nm or greater, then it is stably above 30 emu/g.

Materials for use in magnetic recording preferably have an SFD of 1.10 or less, and while the FePt particle powder obtained according to the Examples of the present invention falls within this range, those from Comparative Examples 1 or 2 are outside this range. From FIG. 5, one can see that if the x-ray crystal grain size (Dx) is 5.0 nm or greater, the SFD is 1.10 or less.

Figure 6:
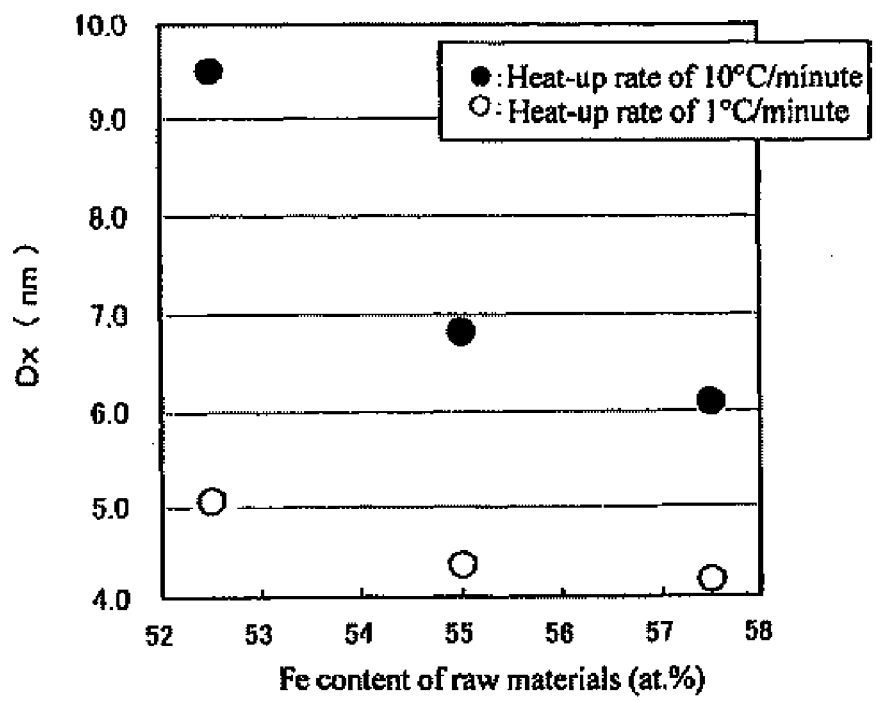
FIG. 6 is a graph of the x-ray crystal grain size ($D_X$) and heat-up rate at the time of the reaction as a function of the ratio of Fe and Pt charged.
Figure 7:
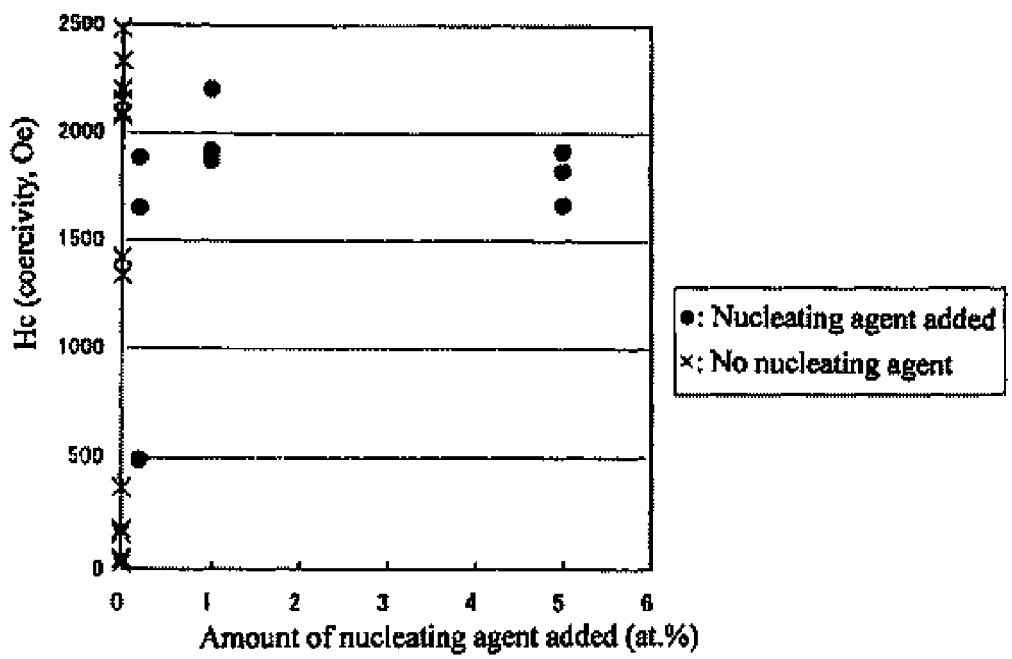
FIG. 7 is a graph showing the effect that the nucleating agent has on the coercivity (Hc) of FePt particle powder.
Figure 8:
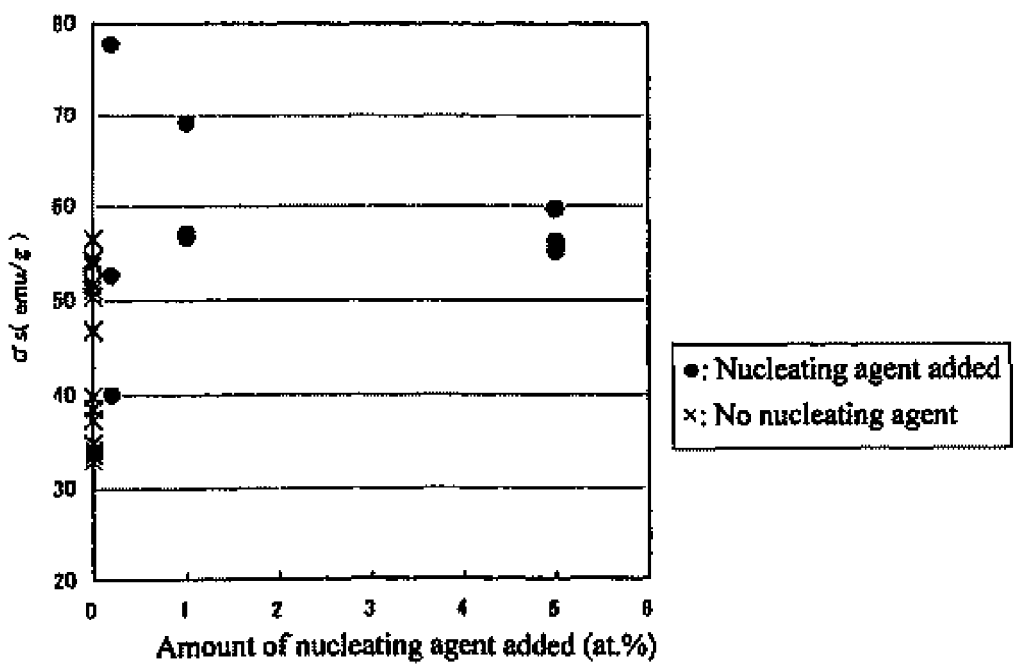
FIG. 8 is a graph showing the effect that the nucleating agent has on the saturation magnetization ($\sigma_s$) of FePt particle powder.
Figure 9:
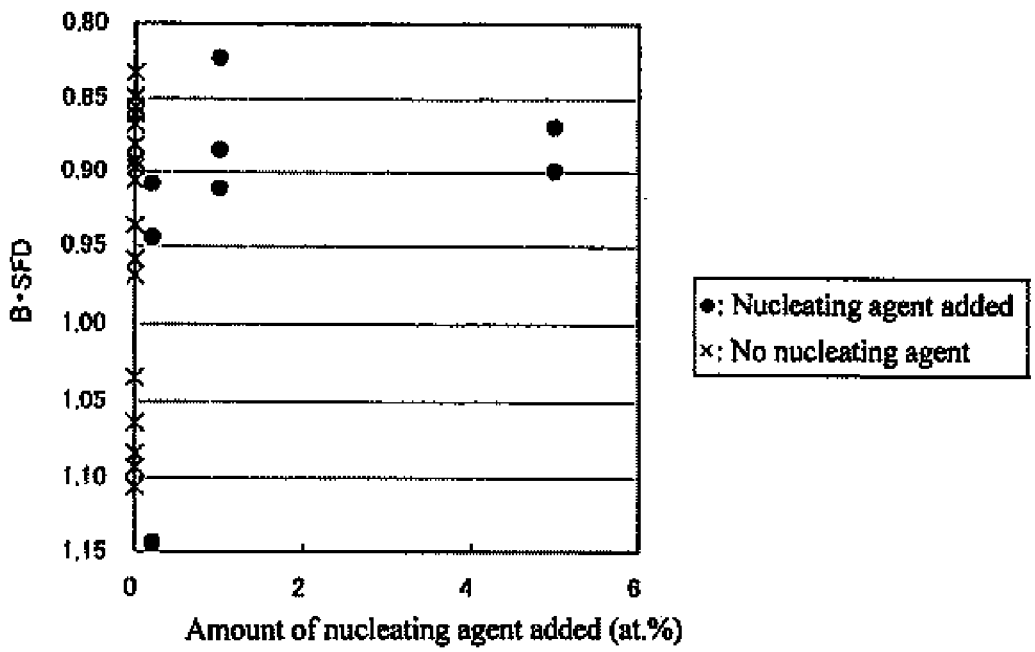
FIG. 9 is a graph showing the effect that the nucleating agent has on the SFD of FePt particle powder.
Figure 10:
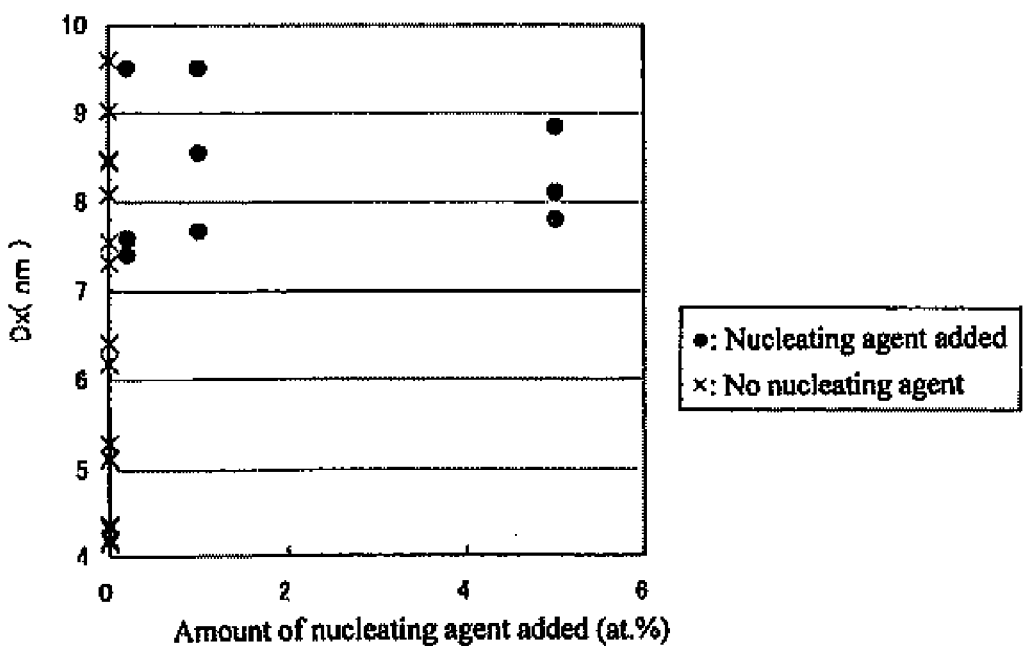
FIG. 10 is a graph showing the effect that the nucleating agent has on the x-ray crystal grain size ($D_X$) of FePt particle powder.

FIG. 6 is a plot of the results of determining the effect that the heat-up rate at the time of the reaction has on the x-ray crystal grain size (Dx) in substances containing FePt particle powder obtained upon varying the ratio of Fe to Pt in the raw material (50:50 at. % in Example 1), when the substances containing FePt particle powder were produced in the same manner as in Example 1 above using the same materials. From the results of FIG. 6, one can see that the x-ray crystal grain size (Dx) becomes larger the higher the heat-up rate is regardless of the ratio of raw materials. In addition, the x-ray crystal grain size (Dx) tends to become larger the higher the heat-up rate, when the ratio of raw materials is the same, so one can see that the x-ray crystal grain size (Dx) has a close correlation to the heat-up rate.

Example 4

To 200 mL of tetraethylene glycol (boiling point: 327° C.), 1.37 mmol/L of iron(III) acetylacetonate and 1.21 mmol/L of platinum(II) acetylacetonate were added and dissolved until no solid residue of iron(III) acetylacetonate and platinum(II) acetylacetonate remains. Thereafter, 0.0005 mmol of $H_2PtCl_6 \cdot 6H_2O$ (equivalent to nucleating agent/total metal added=1 at. %) was added as a nucleating agent. This solution was transferred to a container with a reflux condenser attached and placed in an oil bath. Inert gas consisting of nitrogen was blown into the container at a flow rate of 400 mL/minute while the solution was heated and agitated at a speed of 160 rpm. Refluxing was performed for 5 hours at a temperature of 300° C. and the reaction was halted. At this time, the heat-up rate was set to 10° C./minute. In addition, by the same method as in Example 1, the pressure within the container was kept constant at a pressure 3170 Pa higher than atmospheric pressure during the reaction.

After subjecting the reaction product thus obtained to the same processing as in Example 1, the product was similarly measured and as a result, the average grain size of the primary particles as observed by transmission electron microscopy (TEM) was found to be 8.4 nm. In x-ray diffraction, diffraction peaks corresponding to the superlattice reflections (001) and (110) were observed and face-centered tetragonal crystals were confirmed to be present. The x-ray crystal grain size (Dx) was 9.5 nm. As a result of analyzing he fct structure fraction based on Mössbauer spectroscopic measurement of Fe atoms, the fct structure fraction was found to be 59% as the fct structure volume fraction.

In TEM-EDS measurement, the average composition measured for 1000 or more particles present within the field of view was found to be an atomic ratio of Fe:Pt=52:48. Specifically, $X_{av}$=52.0 at. %. In addition, as a result of analyzing the composition of each of 100 individual particles selected randomly among them, the standard deviation σ was 10% and only two particles did not satisfy the conditions of Equation (1) below.

$$0.90 X_{av} \leq X_1, X_2, \ldots X_{100} \leq 1.10 X_{av} \quad (1)$$

In the measurement of magnetism, the results were coercivity Hc=1915 Oe, saturation magnetization $\sigma_s$=54 emu/g, SQ=0.60 and SFD=0.91.

Comparative Example 3

This example is a test conducted with reference to Patent Document 1 and Non-Patent Document 1.

In a separable flask equipped with a reflux condenser, to 20 mL of dioctylether, 1.5 mmol/L of 1,2 hexadecanediol and 0.5 mmol of Pt(acac)$_2$ were added and N$_2$ gas bubbling was performed while agitating with a glass stirring blade. The mixture was then heated to 100° C. and held there for 30 minutes and then 0.5 mmol of oleic acid and 0.5 mmol of oleylamine were added, and furthermore 1 mmol of Fe(Co)$_5$ was added. The mixture was then heated up to 297° C., refluxed for 30 minutes and then cooled down to room temperature, and then 40 mL of ethanol was added and the mixture was centrifuged. The substance containing a FePt particle powder thus obtained was dispersed in hexane and subjected to the same type of measurement as in Example 1.

As a result, the grain size as observed by transmission electron microscopy (TEM) was found to be 3.7 nm. In the results of x-ray diffraction, diffraction peaks corresponding to the superlattice reflections (001) and (110) due to the fct structure were not observed, with only those peaks due to the fcc structure being observed. The fct structure fraction from Mössbauer measurement was 0%. The x-ray crystal grain size (Dx) was 2.1 nm.

In addition, the same type of TEM-EDS measurement as in Example 4, the average composition measured for 1000 or more particles present within the field of view was found to be an atomic ratio of Fe:Pt=50.5:49.5. Specifically, $X_{av}$V=50.5 at. %. In addition, as a result of analyzing the composition of each of 100 individual particles. selected randomly among them, the standard deviation σ was 22% and nine particles did not satisfy the conditions of Equation (1) above. In the measurement of magnetism, the results were coercivity Hc=2 Oe and saturation magnetization $\sigma_s$=0.02 emu/g.

Comparative Example 4

Example 4 was repeated except that the nucleating agent was not added. The substance containing FePt particle powder thus obtained was subjected to the same type of measurement as in Example 1. As a result, the average grain size of the primary particles as observed by transmission electron microscopy (TEM) was found to be 8.4 nm. The x-ray crystal grain size (Dx) was 5.3 nm. In x-ray diffraction, diffraction peaks corresponding to the superlattice reflections (001) and (110) due to the fct structure were only extremely faintly observed. As a result of analyzing the fct structure fraction based on Mössbauer spectroscopic measurement of Fe atoms, the fct structure fraction was found to be 16% as the fct structure volume fraction.

In TEM-EDS measurement, the average composition measured for 1000 or more particles present within the field of view was found to be an atomic ratio of Fe:Pt=51.8:48.2. Specifically, $X_{av}$=51.8 at. %. In addition, as a result of analyzing the composition of each of 100 individual particles selected randomly among them, the standard deviation σ was 21% and six particles did not satisfy the conditions of Equation (1) above. In the measurement of magnetism, the results were coercivity Hc=182 Oe, saturation magnetization $\sigma_s$=39 emu/g, SQ=0.17 and SFD=1.09.

Comparative Example 5

The substance containing FePt particle powder obtained in Comparative Example 2 above (the example based on Non-Patent Document 2) was subjected to the same TEM-EDS measurement as in Example 4. As a result, the average composition measured for 1000 or more particles present within the field of view was found to be an atomic ratio of Fe:Pt=55.1:44.9. Specifically, $X_{av}$=55.1 at. %. In addition, as a result of analyzing the composition of each of 100 individual particles selected randomly among them, the standard deviation σ was 16% and six particles did not satisfy the conditions of Equation (1) above.

FIGS. 7-10

Three batches were prepared according to Example 4 under the same conditions and moreover, three more batches were prepared according to Example 4 but by varying only the amount of nucleating agent added. Moreover, 17 batches were prepared according to Comparative Example 4 under the same conditions. FIGS. 7-10 present a summary of the relationships between the characteristics of the various substances containing FePt particle powder thus obtained and whether or not a nucleating agent was used and the amount added. As is clear from these figures, though dispersion in the magnetic characteristics would occur when no nucleating agent is used, the dispersion is reduced and stable magnetic characteristics are exhibited when a nucleating agent is used. Specifically, the composition distribution among the individual particles clearly becomes sharper through the use of a nucleating agent.

Example 5

To 100 mL of tetraethylene glycol, 0.13 mmol each of iron(III) acetylacetonate and platinum(II) acetylacetonate were added. Into this solution was bubbled nitrogen at a flow rate of 400 mL/minute while the solution was agitated at a speed of 160 rpm. At the same time, the solution was allowed to react for 3.5 hours under reflux at a temperature of 320° C. Nanoparticles of FePt were thus precipitated to obtain a suspension. The FePt nanoparticles were in the state of coagulation to each other. This suspension consisted of groups of FePt nanoparticles (P) in contact with each other (in the state of coagulation) while being present in an organic medium (A) consisting primarily of tetraethylene glycol (TEG). This suspension is designated the (A+P) liquid.

To the (A+P) liquid suspension thus obtained were added oleic acid and oleylamine as surfactants (as organic medium C) in amounts such that their molarity becomes 4 times that of the total amount of metal in the liquid. Stirring was performed for 1 hour at 80° C. and then shaking was performed for 10 hours at a frequency of 5 Hz and a vibration distance of 2 cm. The suspension (A+P+C) was thus obtained.

On the other hand, to 100 ml of cyclohexane (organic medium B) were added oleic acid and oleylamine as surfactants (as organic medium C) in the same amounts as above, and the solution was stirred so as to be completely dissolved to obtain the (B+C) liquid.

Then, 35 ml of the above (A+P+C) liquid and 35 ml of the above (B+C) liquid were placed in a single container and shaking was performed for 10 hours at a frequency of 5 Hz and a vibration distance of 2 cm. The mixture thus obtained was then allowed to settle and then centrifuged to perform phase separation into two phases: the A phase with the A liquid as its primary component and the B phase with the B liquid as its primary component, thus being separated into the A phase and B phase. Large amounts of FePt nanoparticles were observed to be suspended in the separated B phase liquid.

Next, 35 ml of this B phase and 35 ml of deionized water were placed in a single container and shaking was performed for 10 hours at a frequency of 5 Hz and a vibration distance of 2 cm. The mixture thus obtained was then allowed to settle and then centrifuged to separate it into two phases: the W phase with water as its primary component and the B' phase with the B liquid as its primary component, thus being separated into the W phase and the B' phase. Large amounts of FePt nanoparticles were observed to be suspended in the B' phase.

Figure 11:
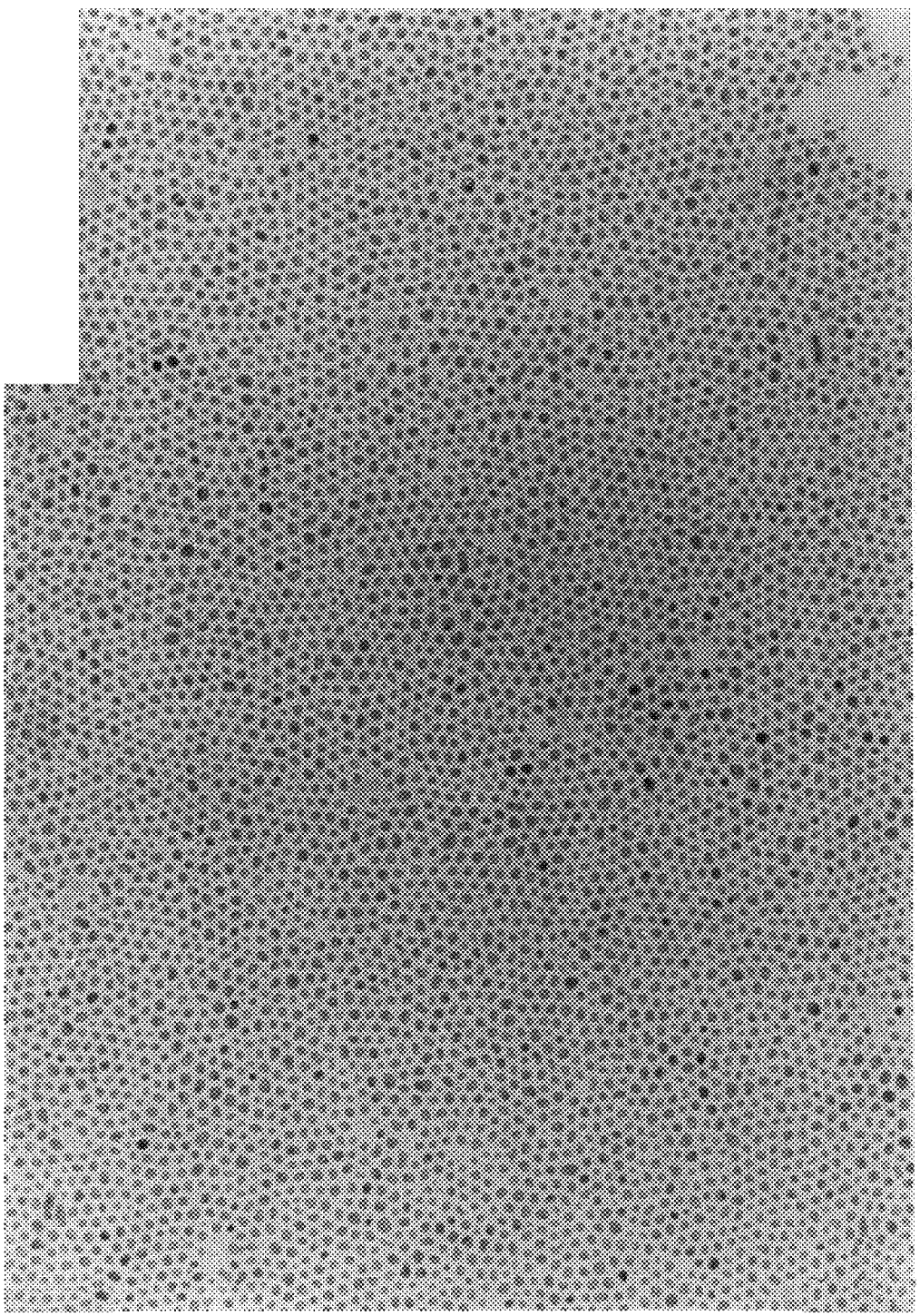
FIG. 11 is an electron microscope (TEM) photograph(300,000×magnification) showing an example of an assemblage of FePt nanoparticles according to the present invention.

The B' phase thus obtained was observed with a transmission electron microscope (TEM). For the observation, a substrate was coated with the B' phase and then the B' phase was allowed to air dry. The average grain size as observed by TEM was found to be 5.2 nm, the standard deviation was 1.0 nm and the average distance between particles was 3.3 nm. In addition, the geometric average value of the grain size was 5.1 nm and the geometric standard deviation was 1.2. FIG. 11 is a TEM photograph of this state. As seen in FIG. 11, one can see that the individual particles are dispersed at the nearly equal distances given above, while also forming a single-layer film that is spread out two-dimensionally. From this, one can see that the surfaces of the individual particles are uniformly coated with surfactant, thus giving the steric hindrance effect.

The particle concentration of this B' phase is $7.85 \times 10^{-4}$ wt. % and the total content of this FePt nanoparticle agglomeration, the cyclohexane and the surfactant was 99.5 wt. %. Accordingly, other impurities consist of 0.5 wt. % or less. In addition, the average grain size by means of the dynamic light-scattering method was 5 nm.

When the composition of this was analyzed by EDX, it was found to be FePt particles with Fe:Pt=59:41. In addition, when these particles were subjected to Fe Mössbauer spectroscopic measurement, an absorption spectrum corresponding to the ferromagnetic ordering of the ordered $L_{10}$ phase was observed at room temperature, and the fraction of the ordered $L_{10}$ phase found by fitting was 52 vol. %. Moreover, when the coercivity Hc and saturation magnetization $\sigma_s$ were measured by SQUID, Hc was 125 kA/m and $\sigma_s$ was 51 Am$^2$/kg, while the temperature of the start of the crystal structure transition $T_1$ found by DSC measurement was 300° C.

Example 6

Example 5 was repeated except that the surfactants (organic medium C) added on the cyclohexane side were all switched to the (A+P+C) suspension side and added. Specifically, the (A+P+2C) suspension was produced by the same method as in Example 5. Thus, 35 ml of this (A+P+2C) liquid and 35 ml of cyclohexane (organic medium B) were placed in a single container and shaking was performed for 10 hours at a frequency of 3 Hz and a vibration distance of 10 cm. Thereafter, the same process as in Example 5 was repeated [$T_xM_{1-x}$] to obtain the B' phase. The B' phase thus obtained was virtually unchanged from that of Example 5.

Example 7

Example 5 was repeated except that the stirring for 1 hour at 80° C. was not given to obtain the (A+P+C) suspension. The (B+C) liquid was added to this (A+P+C) suspension as in Example 5 and thereafter, the same process as in Example 5 was repeated to obtain the B' phase. The B' phase thus obtained was virtually unchanged from that of Example 5.

Example 8

Example 5 was repeated except that the surfactants (organic medium C) added on the cyclohexane side were all switched to the (A+P+C) suspension side and added, and the stirring for 1 hour at 80° C. was not given to produce the (A+P+2C) suspension. Thus, 35 ml of this (A+P+2C) liquid and 35 ml of cyclohexane (organic medium B) were placed in a single container and shaking was performed for 10 hours at a frequency of 3 Hz and a vibration distance of 10 cm. Thereafter, the same process as in Example 5 was repeated to obtain the B' phase. The B' phase thus obtained was virtually unchanged from that of Example 5.

Example 9

To the (A+P) liquid suspension obtained by the same method as in Example 5 were added oleic acid and oleylamine (organic medium C) in the same manner as in Example 5 in amounts such that their molarity becomes 4 times that of the total amount of metal in the liquid. Shaking was performed for 5 hours at a frequency of 3 Hz and a vibration distance of 10 cm. Then, ultrasound was applied for one hour and shaking was performed for 5 hours at a frequency of 3 Hz and a vibration distance of 10 cm to obtain a (A+P+C) suspension. In the same manner as in Example 5, (B+C) was added to this suspension and thereafter the same processing as in Example 5 was performed to obtain the B' phase. The B' phase thus obtained was virtually unchanged from that of Example 5.

Example 10

Example 9 was repeated except that the surfactants (organic medium C) added on the cyclohexane side were all switched to the (A+P+C) suspension side and added, and the (A+P+2C) suspension after ultrasound application was obtained. Thus, 35 ml of this (A+P+2C) liquid and 35 ml of cyclohexane (organic medium B) were placed in a single container and shaking was performed for 10 hours at a frequency of 3 Hz and a vibration distance of 10 cm. Thereafter, the same process as in Example 5 was repeated to obtain the B' phase. The B' phase thus obtained was virtually unchanged from that of Example 5.

Comparative Example 6

To 100 mL of tetraethylene glycol, 0.13 mmol each of iron(III) acetylacetonate and platinum(II) acetylacetonate were added. Into this solution was bubbled nitrogen at a flow rate of 400 mL/minute while the solution was agitated at a speed of 160 rpm. At the same time, the solution was allowed to react for 3.5 hours under reflux at a temperature of 320° C. Nanoparticles of FePt were thus precipitated to obtain a suspension.

Then, 400 g of methanol was added to the liquid suspension thus obtained, a portion of the mixture was collected in a No. 5 bottle, and a compact refrigerated centrifuge (rotor model RT3S3) made by Hitachi Koki Co., Ltd. was used to perform centrifugation for 2 hours at 3000 rpm to obtain the supernatant and precipitate.

Figure 12:
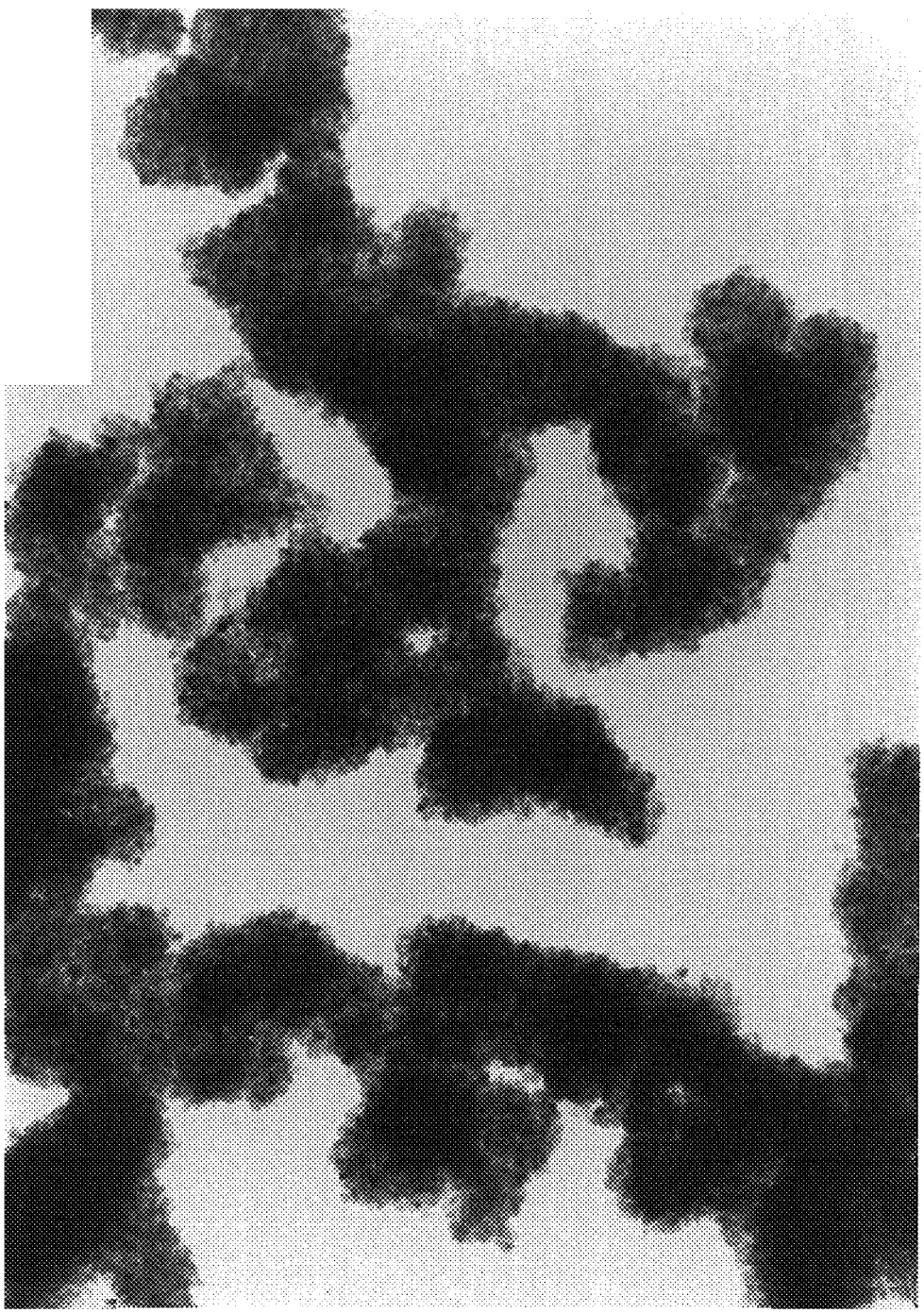
FIG. 12 is an electron microscope (TEM) photograph(300,000×magnification) showing an example of an assemblage of FePt nanoparticles according to a comparative example.

The supernatant was discarded and then 30 mL of methanol was added to the No. 5 bottle, and the precipitate was dispersed by 30 minutes of ultrasound in an ultrasonic cleaner. During this period, the bottom was scraped with a spoon or the like to confirm that all of the precipitate adhering to the bottom was dissipated. The suspension thus obtained was processed in the same centrifuge as above for 30 minutes at 3000 rpm to obtain a supernatant and precipitate. This operation was repeated once again to obtain a precipitate of FePt particles. FIG. 12 is a TEM photograph of the assemblage of FePt particles thus obtained. As seen in FIG. 12, one can see that these FePt particles are severely coagulated.

Comparative Example 7

To 100 mL of tetraethylene glycol, 0.13 mmol each of iron(III) acetylacetonate and platinum(II) acetylacetonate were added. Into this solution was bubbled nitrogen at a flow rate of 400 mL/minute while the solution was agitated at a speed of 160 rpm. At the same time, the solution was allowed to react for 3.5 hours under reflux at a temperature of 320° C. Nanoparticles of FePt were thus precipitated to obtain a suspension. The FePt nanoparticles were in the state of being coagulated to each other.

A portion of the suspension thus obtained was collected as is in a No. 5 bottle, and a compact refrigerated centrifuge (rotor model RT3S3) made by Hitachi Koki Co., Ltd. was used to perform centrifugation for 2 hours at 3000 rpm, but virtually no precipitate was obtained.

The invention claimed is:

1. Assemblages of particles of a magnetic alloy represented by the formula $[T_X M_{1-X}]$ containing T and M in a composition ratio where X in the formula is in the range from 0.3 or greater to 0.7 or less, where T is one or two members of the group consisting of Fe and Co and M is one or two members of the group consisting of Pt and Pd, and metallic elements other than T and M that constitute no more than 30 at. % (including 0 at. %) of (T+M) as a percentage of atoms, and the remainder consists of impurities that are unavoidable from a production standpoint, wherein: said assemblages of magnetic alloy particles are such that:

A. the face-centered tetragonal fraction is 10-100%,
B. the average grain size as measured by TEM observation ($D_{TEM}$) is in the range from 5-30 nm,
C. the x-ray crystal grain size derived by x-ray diffraction ($D_X$) is no less than 4 nm,
D. the particles of the size $D_{TEM}$ above are dispersed from each other at a distance, and
E. 95 or more out of 100 particles satisfy the conditions of Equation (1) below, and Equation (2) is also satisfied;

$$0.90 X_{av} \leq X_1, X_2, \ldots X_{100} \leq 1.10 X_{av} \qquad (1)$$

$$\text{standard deviation sigma of } X_1, X_2, \ldots X_{100} 20\% \qquad (2)$$

here, $X_{av}$ represents the value of X in the composition formula $[T_X M_{1-X}]$ as actually measured in the assemblage of particles (the value of X in the average composition of the particle assemblage), and $X_1, X_2, \ldots X_{100}$ represent the values of X in the composition formula measured in individual particles in TEM-EDX measurement of the assemblages, for each of 100 particles $X_n$ selected arbitrarily when 1000 particles are in the field of view of measurement, wherein each particle has fluidity in the state of being dispersed at a distance from each other.

2. Assemblages of magnetic alloy particles according to claim 1, wherein each particle has its position fixed in the state of being dispersed at a distance from each other.

3. Assemblages of magnetic alloy particles according to claim 1, wherein the surface of each particle is coated with a surfactant.

4. Metallic magnetic powder according to claim 1, wherein at least one type of coupling agent selected from the group consisting of a silane coupling agent, titanate coupling agent and an aluminate coupling agent is existed among the individual particles.

5. Assemblages of magnetic alloy particles according to claim 1, wherein the x-ray crystal grain size ($D_x$) is 6 nm or greater and the coercivity (Hc) is 1000 Oe or greater.

6. Assemblages of magnetic alloy particles according to claim 1, wherein the metallic elements other than T and M are at least one element selected from the group consisting of the Z components defined below; Z components: Ag, Cu, Sb, Bi and Pb.

7. Assemblages of magnetic alloy particles according to claim 1, wherein the metallic elements other than T and M are at least one element selected from the group consisting of the N components defined below; N components: Au, Ru, Rh, Os and Ir.

8. Assemblages of magnetic alloy particles according to claim 1, wherein the particles are dispersed at roughly equal distances of at least 1 nm from each other.

* * * * *